United States Patent
Jueng et al.

(10) Patent No.: US 10,395,233 B2
(45) Date of Patent: Aug. 27, 2019

(54) MOBILE TERMINAL AND METHOD FOR CONTROLLING THE SAME

(71) Applicant: LG ELECTRONICS INC., Seoul (KR)

(72) Inventors: Mose Jueng, Seoul (KR); Jungeun Shin, Seoul (KR); Jeonghyun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 560 days.

(21) Appl. No.: 14/951,098

(22) Filed: Nov. 24, 2015

(65) Prior Publication Data
US 2016/0342973 A1 Nov. 24, 2016

(30) Foreign Application Priority Data
May 20, 2015 (KR) .......................... 10-2015-0070547

(51) Int. Cl.
  *G06Q 40/00* (2012.01)
  *G06Q 20/32* (2012.01)
  (Continued)

(52) U.S. Cl.
  CPC ......... *G06Q 20/322* (2013.01); *G06Q 20/085* (2013.01); *G06Q 20/325* (2013.01); *G06Q 30/06* (2013.01)

(58) Field of Classification Search
  CPC ............................. G06Q 20/08; G06Q 20/322
  (Continued)

(56) References Cited

U.S. PATENT DOCUMENTS

| 8,954,290 | B2 * | 2/2015 | Yuen ....................... H04W 4/21 |
| | | | 702/160 |
| 2008/0010193 | A1 * | 1/2008 | Rackley, III ......... G06Q 20/042 |
| | | | 705/39 |

(Continued)

FOREIGN PATENT DOCUMENTS

| EP | 2830293 | 1/2015 |
| EP | 3032478 A1 * | 6/2016 ............. G06Q 20/29 |

(Continued)

OTHER PUBLICATIONS

"Trusted Logic; "Mobile Station Including a Short-Range Radio Section and Corresponding Method" in Patent Application Approval Process", Politics & Government Week; Atlanta [Atlanta]—1444; Dec. 6, 2012 (Year: 2012).*

(Continued)

*Primary Examiner* — Edward J Baird
(74) *Attorney, Agent, or Firm* — Lee Hong Degerman Kang & Waimey

(57) ABSTRACT

The present disclosure relates to a mobile terminal having a lateral display unit and a control method thereof. A mobile terminal according to the present disclosure may include a body having a front surface, a lateral surface and a rear surface; a display unit having a first region disposed on the front surface and a second region extended from the first region and disposed on the lateral surface; and a controller configured to display payment related information in the second region based on signals transmitted to and received from an external payment server while the first region is in an inactive state, and execute payment while the first region is in an inactive state based on the signals transmitted to and received from the payment server and the payment related information.

19 Claims, 21 Drawing Sheets

(51) Int. Cl.
*G06Q 30/06* (2012.01)
*G06Q 20/08* (2012.01)

(58) Field of Classification Search
USPC .................................................. 705/35–40
See application file for complete search history.

(56) References Cited

U.S. PATENT DOCUMENTS

| | | | | |
|---|---|---|---|---|
| 2008/0059364 | A1* | 3/2008 | Tidwell | G06Q 20/403 |
| | | | | 705/38 |
| 2011/0312286 | A1* | 12/2011 | Lin | H04W 52/0254 |
| | | | | 455/73 |
| 2011/0320345 | A1* | 12/2011 | Taveau | G06Q 20/32 |
| | | | | 705/39 |
| 2012/0265587 | A1* | 10/2012 | Kinkead | G06Q 30/02 |
| | | | | 705/14.1 |
| 2013/0173456 | A1* | 7/2013 | Grigg | G06Q 20/3221 |
| | | | | 705/39 |
| 2013/0178248 | A1 | 7/2013 | Kim | |
| 2013/0300697 | A1 | 11/2013 | Kim et al. | |
| 2014/0032414 | A1* | 1/2014 | Beisner | G06Q 20/382 |
| | | | | 705/44 |
| 2014/0342663 | A1* | 11/2014 | Eaton | H04M 1/04 |
| | | | | 455/41.1 |
| 2015/0120512 | A1* | 4/2015 | Chen | G06Q 20/12 |
| | | | | 705/27.1 |
| 2016/0077718 | A1* | 3/2016 | Kwon | G06F 1/1694 |
| | | | | 345/173 |

FOREIGN PATENT DOCUMENTS

| | | | | |
|---|---|---|---|---|
| FR | 2888381 A1 | * | 1/2007 | G06F 1/1626 |
| JP | 2013257878 A | * | 12/2013 | G06Q 20/085 |

OTHER PUBLICATIONS

European Patent Office Application Serial No. 16150725.6, Office Action dated Aug. 22, 2017, 7 pages.
European Patent Office Application Serial No. 16150725.6, Search Report dated Apr. 7, 2016, 7 pages.

\* cited by examiner

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2015-0070547, filed on May 20, 2015, the contents of which are all hereby incorporated by reference herein in their entirety.

BACKGROUND OF THE INVENTION

1. Field of the Invention

The present disclosure relates to a mobile terminal having a lateral display unit and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Various attempts have been applied in terms of hardware and software to implement such a complicated function of the multimedia player. For an example, user interface environments for allowing a user to make payment using a terminal in an easy and convenient manner have been provided.

Furthermore, many users have their mobile terminals to express their own personalities, and accordingly, various designs are required for the mobile terminals. Such designs may also include structural changes and improvements for the user to more conveniently use the mobile terminal. A lateral display unit and a user interface using the same will be taken into consideration for such structural changes and improvements.

SUMMARY OF THE INVENTION

An aspect of the present disclosure is to solve the foregoing problem and other problems. Another aspect of the present disclosure is to provide a mobile terminal capable of executing payment using a lateral display even in a state that a front display is in an inactive state and a control method thereof.

In order to accomplish the above and other objects, according to an aspect of the present disclosure, there is provided a mobile terminal including a body having a front surface, a lateral surface and a rear surface; a display unit having a first region disposed on the front surface and a second region extended from the first region and disposed on the lateral surface; and a controller configured to display payment related information in the second region based on signals transmitted to and received from an external payment server while the first region is in an inactive state, and execute payment while the first region is in an inactive state based on the signals transmitted to and received from the payment server and the payment related information.

According to an embodiment, the controller may display an object corresponding to a preset payment method in the second region, and execute payment while the first region is in an inactive state with the preset payment method.

According to another embodiment, the controller may display a plurality of objects corresponding to a plurality of payment methods, respectively, in the second region, and execute payment while the first region is in an inactive state with a payment method corresponding to the selected object based on applying a touch input for selecting any one of the plurality of objects to the second region.

According to still another embodiment, the controller may display a first object corresponding to a first payment method in the second region, and display a second object corresponding to a second payment method in the second region based on applying a preset touch input to the first region in an inactive state.

Subsequently, the controller may execute payment while the first region is in an inactive state with the second payment method based on applying a preset touch input to the first region in an inactive state in a state that the second object is displayed in the second region.

According to yet still another embodiment, the controller may display an input request message for security information in the second region when determined to correspond to a preset condition based on the signals transmitted to and received from the payment server and the payment related information.

Specifically, the controller may display an input request message for security information in the second region when determined that an amount of payment is above a preset amount.

Subsequently, the controller may execute payment while the first region is in an inactive state based on the signals transmitted to and received from the payment server and the payment related information on the basis of security information entered to the first region being authenticated.

According to still yet another embodiment, the controller may start transmitting and receiving a signal to and from an external payment server while the first region is in an inactive state based on security information received from a user being authenticated.

According to yet still another embodiment, the controller may produce a plurality of payment methods for a plurality of consumption types, respectively, based on payment history information that has been executed for a preset period of time.

Specifically, the controller may display a plurality of objects corresponding to the plurality of consumption types, respectively, in the second region, and display a plurality of objects corresponding to a plurality of payment methods, respectively, produced for a consumption type corresponding to the selected object in the first region in an inactive state based on applying a touch input for selecting any one of the plurality of objects to at least one of the first and the second region.

Subsequently, the controller may execute payment while the first region is in an inactive state with a payment method corresponding to the selected object based on applying a touch input for selecting any one of a plurality of objects displayed in the first region in an inactive state to the first region.

According to still yet another embodiment, the controller may display a plurality of objects corresponding to a plurality of discount methods, respectively, in the first region in an inactive state based on applying a touch input for selecting an object corresponding to discount information displayed in the second region to at least one of the first and the second region, and apply a discount method corresponding to the selected object to execute payment while the first region is in an inactive state based on applying a touch input for selecting any one of the plurality of objects to the first region.

According to yet still another embodiment, wherein the controller may display a plurality of objects corresponding to a plurality of accumulation methods, respectively, in the first region in an inactive state based on applying a touch input for selecting an object corresponding to accumulation information displayed in the second region to at least one of the first and the second region, and apply an accumulation method corresponding to the selected object to execute payment while the first region is in an inactive state based on applying a touch input for selecting any one of the plurality of objects to the first region.

According to still yet another embodiment, the controller may display a payment complete message in the second region based on the completion of payment while the first region is in an inactive state.

Furthermore, according to another aspect of the present disclosure, there is provided a method of controlling a mobile terminal, and the method may include (a) displaying payment related information in a second region of a display unit extended from a first region and disposed on a lateral surface of the body based on signals transmitted to and received from an external payment server while the first region of the display unit disposed on a front surface of the body is in an inactive state; and (b) executing payment while the first region is in an inactive state based on the signals transmitted to and received from the payment server and the payment related information.

According to an embodiment, said step (a) may include displaying an object corresponding to a preset payment method in the second region, and said step (b) may include executing payment while the first region is in an inactive state with the preset payment method.

According to another embodiment, said step (a) may include displaying a plurality of objects corresponding to a plurality of payment methods, respectively, in the second region, and said step (b) may include executing payment while the first region is in an inactive state with a payment method corresponding to the selected object based on applying a touch input for selecting any one of the plurality of objects to the second region.

According to still another embodiment, said step (a) may include displaying a first object corresponding to a first payment method in the second region, and displaying a second object corresponding to a second payment method in the second region based on applying a preset touch input to the first region in an inactive state, and said step (b) may include executing payment while the first region is in an inactive state with the second payment method based on applying a preset touch input to the first region in an inactive state in a state that the second object is displayed in the second region.

According to yet still another embodiment, said step (a) may include producing a plurality of payment methods for a plurality of consumption types, respectively, based on payment history information that has been executed for a preset period of time.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
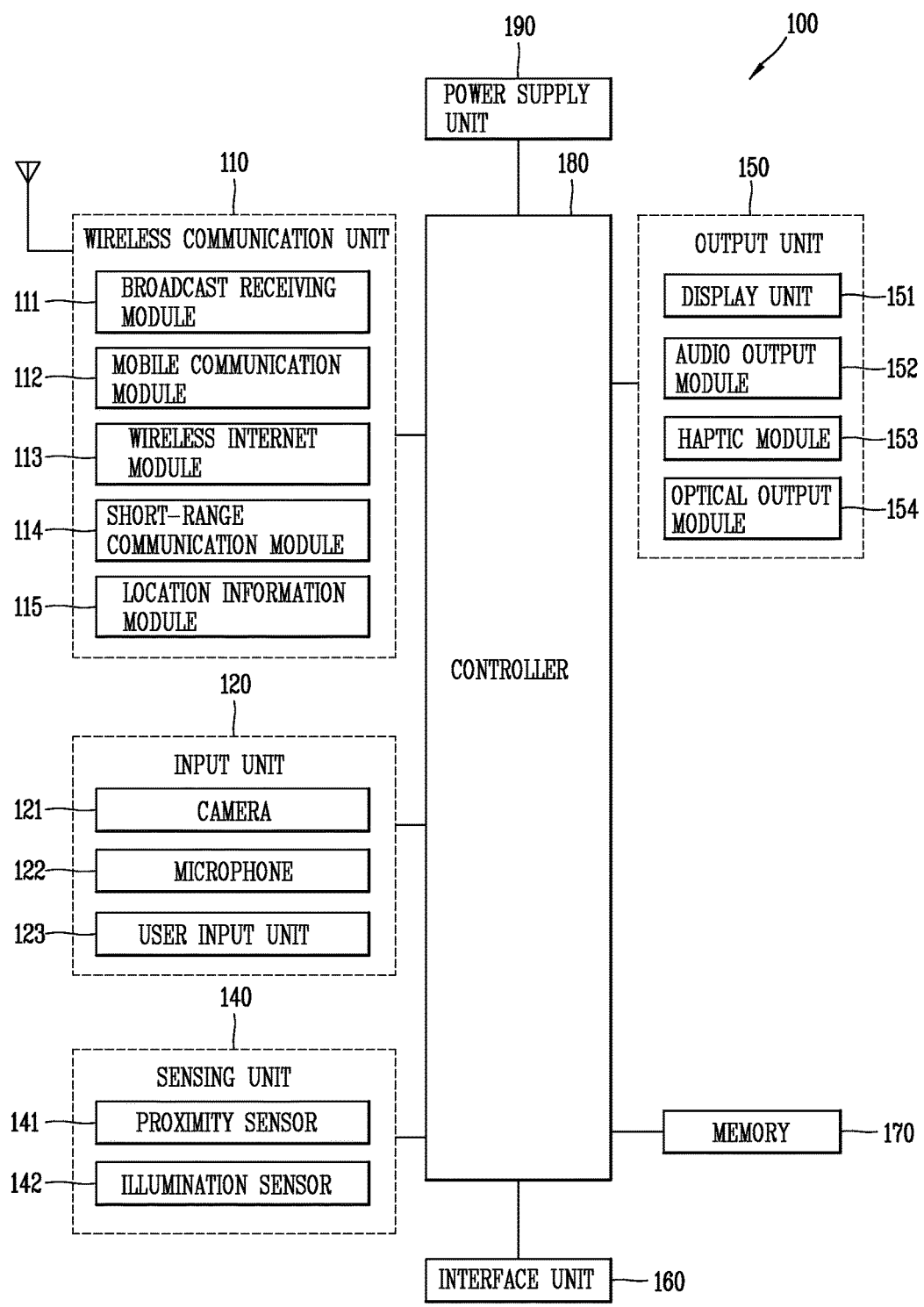
FIG. 1A is a block diagram for explaining a mobile terminal associated with the present disclosure.
Figure 1B:
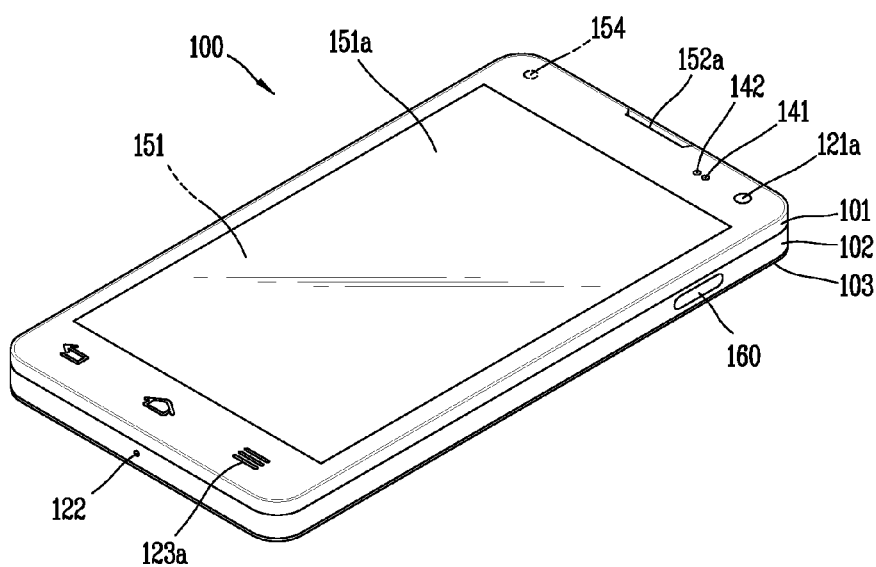
FIGS. 1B and 1C are conceptual views illustrating an example in which a mobile terminal associated with the present disclosure is seen from different directions.
Figure 1C:
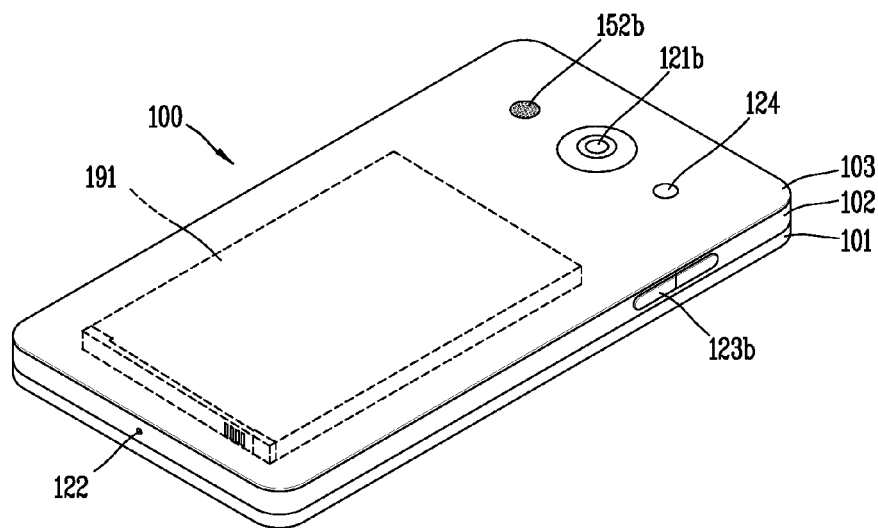

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller

180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151*a* and a display (not shown) on a rear surface of the window 151*a* or patterned directly on the rear surface of the window 151*a*. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123*a*.

The first audio output module 152*a* may be implemented in the form of a receiver for transferring voice sounds to the user's ear or a loud speaker for outputting various alarm sounds or multimedia reproduction sounds.

The window 151*a* of the display unit 151 may include a sound hole for emitting sounds generated from the first audio output module 152*a*. Here, the present disclosure may not be limited to this. It may also be configured such that the sounds are released along an assembly gap between the structural bodies (for example, a gap between the window 151*a* and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121*a* may process video frames such as still or moving images obtained by the image sensor in a video call mode or a capture mode. The processed video frames may be displayed on the display unit 151 or stored in the memory 170.

The first and second manipulation units 123*a* and 123*b* are examples of the user input unit 123, which may be manipulated by a user to input a command for controlling the operation of the mobile terminal 100. The first and second manipulation units 123*a* and 123*b* may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

As aforementioned with reference to FIG. 1A, a short-range communication technique, such as Bluetooth™, Radio Frequency Identification (RFID), Infrared Data Association (IrDA), Ultra Wideband (UWB), ZigBee and Near Field Communication (NFC), may be applicable to the mobile terminal according to the present invention.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The security module may be a physical medium such as UICC (Universal Integrated Circuit Card) (e.g., SIM (Subscriber Identification Module) or USIM (Universal SIM)), a secure micro SD and a sticker, or a logical medium (e.g., embedded SE (Secure Element)) embedded in the mobile terminal. SWP (Single Wire Protocol)-based data exchange may be performed between the NFC module and the security module.

In a case where the NFC module operates in a card mode, the mobile terminal may transmit card information on a general IC card to outside. More specifically, if a mobile terminal having therein card information on a payment card (e. g, a credit card or a bus card) is made to approach to a card reader, a short-range mobile payment may be executed. On the other hand, if a mobile terminal which stores card information on an entrance card is made to approach to an entrance card reader, an entrance approval procedure may start. A card such as a credit card, a traffic card and an entrance card may be mounted in the security module in the form of applet, and the security module may store card information on the card mounted therein. Card information of a payment card may be at least one of a card number, a remaining amount and a usage history. Card information of an entrance card may be at least one of a user's name, a user's number (e.g., undergraduate number or staff number) and an entrance history.

In a case where the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In a case where the NFC module operates in a (Peer-to-Peer) P2P mode, the mobile terminal may execute P2P communication with another mobile terminal. In this case, LLCP (Logical Link Control Protocol) may be applied to the P2P communication. For the P2P communication, connection may be generated between the mobile terminal and said another mobile terminal. The connection may be categorized into a connectionless mode which ends after one packet is switched, and a connection-oriented mode in which packets are switched consecutively. For the P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is short.

On the other hand, a mobile terminal according to the present disclosure may have various design forms. Hereinafter, as one of the structural changes and improvements, a mobile terminal having a lateral display unit and a user interface using the same will be described.

Figure 2A:
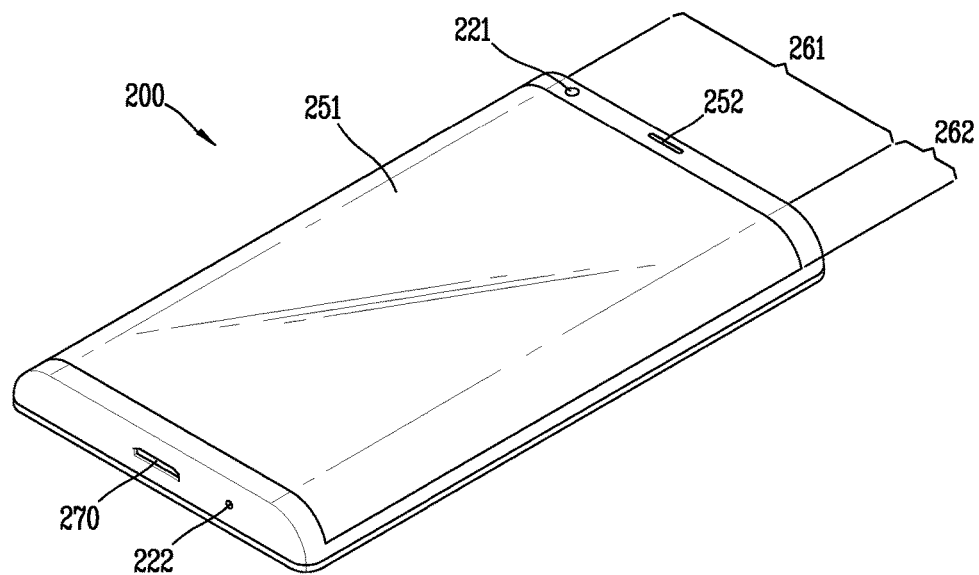
FIG. 2A is a front perspective view illustrating another example of a mobile terminal associated with the present disclosure'
Figure 2B:
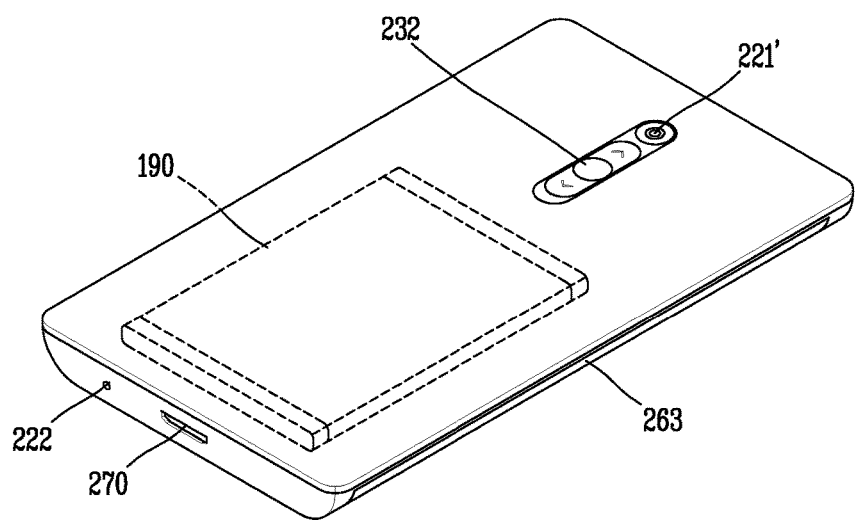
FIG. 2B is a rear perspective view illustrating a mobile terminal illustrated in FIG. 2A.

FIG. 2A is a front perspective view illustrating another example of a mobile terminal associated with the present disclosure, and FIG. 2B is a rear perspective view of a mobile terminal illustrated in FIG. 2A.

The mobile terminal 200 disclosed herein is provided with a bar-type terminal body. However, the present disclosure may not be necessarily limited to this type of terminal, but also may be applicable to various structures of terminals such as a slide type, a folder type, a swing type, a swivel type or the like, in which two and more bodies are combined with each other in a relatively movable manner.

The body includes a case (casing, housing, cover, etc.) forming an external appearance of the terminal. In this embodiment, the case may be divided into a front case 201 and a rear case 202 (refer to FIGS. 3A and 3B). Various electronic elements are integrated into a space between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti) or the like.

A display unit 251, an audio output unit 252, a camera module 221 and the like may be formed on the terminal body, mainly on the front case 201. An interface unit 270 and the like may be disposed on a lateral surface of the front case 201 and rear case 202.

The display unit 251 occupies most of the primary surface of the front case 202. In other words, the display unit is disposed on a front surface of the terminal, and formed to display visual information. The display unit 251 according to the present disclosure is implemented in a form of being extended to a front surface of the terminal as well as to another surface of the terminal. More specifically, the display unit 251 may include a first region 261 disposed on the front surface and a second region 262, 263 extended from the first region 261 and disposed on a lateral surface of the body. Here, the lateral surface may be a surface seen from a user when the user views the mobile terminal from the lateral surface (or the side).

On the other hand, at least part of the second region 262, 263 may be disposed on a front surface thereof. For example, the second region 262, 263 may be formed over a front surface and a front surface of the terminal. Here, whether or not the second region 262, 263 is seen from the front surface is determined according to a structure in which the first and the second region 261, 262, 263 are formed on the display unit 251.

For example, a window disposed on an upper surface of the display unit 251 is formed in a shape in which both the lateral surfaces are bent, and as a result, an external appearance of the front and lateral surfaces of the body is formed by the window. Accordingly, the first region 261 and second region 262, 263 may be connected to each other in a shape having no physical interface. In this case, the display unit 251 is formed in a bent shape, and may include display elements integrated to correspond to the window.

For another example, the display unit 251 may be a flexible display unit. The flexible display may include a flexible, bendable, twistable, foldable and rollable display. Here, the flexible display unit may include both typical flexible displays and electronic paper.

Here, typical flexible display may denote a light and non-fragile rigid display fabricated on a thin and flexible substrate that can be warped, bent, folded or rolled like a paper sheet while maintaining the display characteristics of a flat display in the related art.

Furthermore, electronic paper as a display technology to which a typical characteristic of ink is applied may be different from that of a typical flat panel display in which reflective light is used. Electronic paper may change a drawing or text using twist balls or electrophoresis using capsules.

In this manner, it may be possible to configure a terminal body having a form in which both lateral surfaces of the display unit is warped by flexible material properties.

The audio output unit 252 and a camera module 221 may be disposed in a region adjacent to one of both end portions of the display unit 251, and a front input unit (not shown) and a microphone 222 may be disposed in a region adjacent to the other end portion.

The front input unit as an example of the user input unit 230 (refer to FIG. 1) may include a plurality of manipulating units. The manipulating units may be commonly referred to as a manipulating portion, and any method may be employed if it is a tactile manner allowing the user to perform manipulation with a tactile feeling.

Furthermore, the display unit 251 may form a touch screen along with a touch sensor, and in this case, the touch screen may be a user input unit. Through this, it may be possible to have a configuration with no front input unit on a front surface of the terminal. In this case, a mobile terminal may be configured to enable input manipulation to the terminal body only through the display unit 251 and a rear input unit 232 which will be described later.

Referring to FIG. 2B, a camera module 221' may be additionally mounted on a rear surface of the terminal body, namely, the rear case 202. The camera module 221' has an image capturing direction, which is substantially opposite to the direction of the camera 221 (refer to FIG. 2B), and may have a different number of pixels from that of the camera module.

For example, it is preferable that the camera module 221 has a relatively small number of pixels enough not to cause a difficulty when the user captures his or her own face and immediately sends it to the other party during a video call or the like, and the camera module 221' has a relatively large number of pixels since the user often captures a general object but does not sends it immediately. The camera modules 221, 221' may be provided in the terminal body in a rotatable and popupable manner.

A flash and a mirror may be additionally disposed adjacent to the camera module 221'. The flash illuminates light toward an subject when capturing the subject with the camera module 221'. The mirror allows the user to look at his or her own face, or the like, in a reflected way when capturing himself or herself (in a self-portrait mode) by using the camera module 221'.

An audio output unit (not shown) may be additionally disposed on a rear surface of the terminal body. The audio output unit on a rear surface thereof together with the audio output unit 252 (refer to FIG. 2A) on a front surface thereof can implement a stereo function, and may be also used to implement a speaker phone mode during a phone call.

In other words, a second audio output unit configured with a speaker on a rear surface of the terminal may be formed along with the audio output unit 252 (first audio output unit) configured with a receiver on a front surface thereof.

A power supply unit 290 for supplying power to the portable terminal 200 may be mounted on the terminal body. The power supply unit 290 may be configured to be incorporated in the terminal body, or directly detachable from the outside of the terminal body.

According to the drawing, a rear input unit 232 may be disposed on a rear surface of the terminal body. The rear input unit 232 may be located at a lower portion of the camera module 221', for example.

The rear input unit 232 may be manipulated to receive a command for controlling the operation of the mobile terminal 200, and the received content may be set in various ways. For example, it may be possible to receive a command such as power on/off, start, end, scroll or the like, or a command such as volume adjustment output from the audio output unit 252, switching to a touch recognition mode of the display unit 251, or the like. However, the present disclosure may not be necessarily limited to this, and the terminal may include only either one or both of the front input unit and rear input unit 232.

On the other hand, as described above, the controller 180 (refer to FIG. 1A) may control a function of the terminal using a display unit disposed on a lateral surface of the terminal.

Hereinafter, a method of controlling the function of the terminal using display units disposed on both lateral surfaces thereof will be described in more detail with reference to the accompanying drawings.

For the sake of convenience of explanation, a first region denotes a display region (or front display unit) disposed on a front surface of the body having a front surface, a lateral surface and a rear surface thereof, and a second region denotes a display region (or lateral display unit) disposed on a lateral surface thereof.

On the other hand, the display unit 251 illustrated in the specification may include both a second region 262 which is a right display region and a third region 263 which is a left display region based on a first region 261 corresponding to a front surface of the display unit 251. Otherwise, on the contrary, the display unit 251 according to the present disclosure is illustrated to include display regions on both the left and right lateral surfaces, but the display unit 251 may further include a lateral display unit only at either one of the left and right sides thereof based on the first region 261 corresponding to a front surface of the display unit 251.

According to another embodiment, the display unit 251 according to the present disclosure may include at least one of a second region 262 which is a right display region, a third region 263 which is a left display region, a fourth region (not shown) which is an upper display region and a firth region (not shown) which is a lower display region on the basis of a first region 261 corresponding to a front surface of the display unit 251. Here, the upper, lower, left, right and front display units may be connected to each other or the respective display units may be disposed adjacent to each other.

Accordingly, the display unit 251 according to the present disclosure may be implemented in various ways such as including a first region 261 corresponding to a front surface of the display unit 251, a second region 262 which is a right display region, and a fourth region (not shown) which is an upper display unit, and the like.

However, according to the present disclosure, for the sake of convenience of explanation, a display unit 251 including display regions (or display units) on the front, left and right surfaces thereof, respectively, will be described as an example. For another example, a display unit 251 including display regions (or display units) on the front, upper and lower surfaces thereof, respectively, will be described as an example.

Accordingly, it should be understood by those skilled in the art that the present disclosure can be applicable to a terminal including a display region (or display unit) only on either one of the left and right surfaces thereof. Similarly, it should be understood by those skilled in the art that the present disclosure can be also applicable to a terminal including a display region (or display unit) only on either one of the upper and lower surfaces thereof.

Moreover, according to the present disclosure, the front display unit (or first region) will be described using reference numeral "261", and the lateral display units (or second region, third region, fourth region, fifth region) will be described using reference numerals, "262", "262", "264" and "265". Furthermore, the "display unit 251" instead of a reference numeral indicating the front or lateral display unit will be described for the content that the present disclosure is applicable to both the front and lateral display units regardless of the classification of the front and lateral display units.

Hereinafter, embodiments associated with a control method that can be implemented in a mobile terminal having the foregoing configuration will be described with reference to the accompanying drawings. It should be understood by those skilled in the art that the present invention can be embodied in other specific forms without departing from the concept and essential characteristics thereof.

As described above, a mobile terminal 100 according to the present disclosure may include a body, a display unit 251 and a controller 180.

Specifically, the body may include a front, a lateral and a rear surface, and the display unit 251 may include a first region 261 disposed on the front surface, and a second region 262, 263, 264, 265 extended from the valve 161 and disposed on the lateral surface.

The controller 180 may display payment related information in the second region 262 based on signals transmitted to and received from an external payment server while the first region 261 is in an inactive state, and execute payment while the first region 261 is in an inactive state based on the signals transmitted to and received from the payment server and the payment related information.

Meanwhile, a consumption type may be defined as a type of a product or service that can be purchased. An accumulation method may be defined as a method for controlling credit for discount on future purchases, and accumulation information may be defined as an accumulation card or an icon corresponding to the accumulation card.

Figure 3:
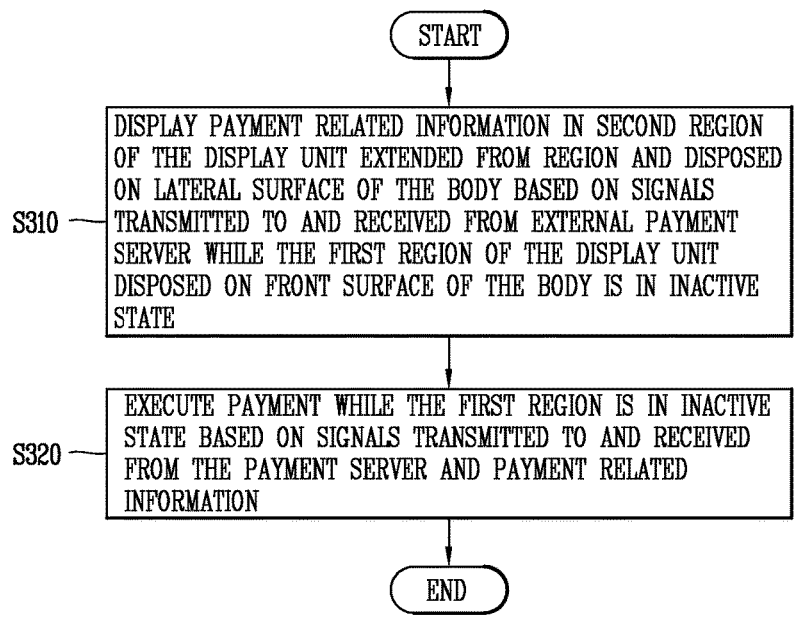
FIG. 3 is a flow chart for explaining an embodiment of a control method of a mobile terminal according to the present disclosure.

FIG. 3 is a flow chart for explaining an embodiment of a control method of a mobile terminal according to the present disclosure.

Referring to FIG. 3, first, the process (S310) of displaying payment related information on the second region 262, 263, 264, 265 of the display unit 251 extended from the first region 261 and disposed on a lateral surface of the body based on signals transmitted to and received from an external payment server while the first region 261 displayed on a front surface of the body is in an inactive state is carried out.

As described above, the second region 262, 263, 264, 265 may be a region disposed on the upper, lower, left and right side of the body. Furthermore, the external payment server may be an NFC payment system, an NFC payment terminal or the like performing communication with an NFC module within the mobile terminal 100.

Subsequently, the process (S320) of executing payment while the first region 261 is in an inactive state based on the signals transmitted to and received from the payment server and the payment related information is carried out.

Here, the inactive state denotes a case where at least part of the display unit 251 is in an OFF state. According to the present disclosure, payment may be carried out without turning on the screen 251 or in a state that only part thereof is turned on.

Hereinafter, an executable embodiment will be described.

According to an embodiment, the controller 180 may display an object corresponding to a preset payment method in the second region 262, 263, 264, 265, and execute payment while the first region 261 is in an inactive state with the preset payment method.

According to another embodiment, the controller 180 may display a plurality of objects corresponding to a plurality of payment methods, respectively, in the second region 262, 263, 264, 265, and execute payment while the first region 261 is in an inactive state with a payment method corresponding to the selected object based on applying a touch input for selecting any one of the plurality of objects to the second region 262, 263, 264, 265.

According to still another embodiment, the controller 180 may display a first object corresponding to a first payment method in the second region 262, 263, 264, 265, and display a second object corresponding to a second payment method in the second region 262, 263, 264, 265 based on a preset touch input applied to the first region 261 in an inactive state.

Subsequently, the controller 180 may execute payment while the first region 261 is in an inactive state with the second payment method based on a preset touch input applied to the first region 261 in an inactive state in a state that the second object is displayed on the second region 262, 263, 264, 265.

According to yet still another embodiment, the controller 180 may display an input request message for security information in the second region 262, 263, 264, 265 when determined to correspond to a preset condition based on the signals transmitted to and received from the payment server and the payment related information.

Specifically, the controller 180 may display an input request message for security information in the second region 262, 263, 264, 265 when determined that an amount of payment is above a preset amount.

Subsequently, the controller 180 may execute payment while the first region 261 is in an inactive state based on the signals transmitted to and received from the payment server and the payment related information on the basis of security information entered to the first region 261 being authenticated.

According to another embodiment, the controller 180 may start transmitting and receiving a signal to and from an external payment server while the first region 261 is in an inactive state based on security information received from a user being authenticated.

According to still another embodiment, the controller 180 may produce a plurality of payment methods for a plurality of consumption types, respectively, based on payment history information that has been executed for a preset period of time.

Specifically, the controller 180 may display a plurality of objects corresponding to the plurality of consumption types, respectively, in the second region 262, 263, 264, 265, and display a plurality of objects corresponding to a plurality of payment methods, respectively, produced for a consumption type corresponding to the selected object in the first region 261 in an inactive state based on applying a touch input for selecting any one of the plurality of objects to at least one of the first region 261 and the second region 262, 263, 264, 265.

Subsequently, the controller 180 may execute payment while the first region 261 is in an inactive state with a payment method corresponding to the selected object based on applying a touch input for selecting any one of a plurality of objects displayed in the first region in an inactive state to the first region 261.

According to another embodiment, the controller 180 may display a plurality of objects corresponding to a plurality of discount methods, respectively, in the first region 261 in an inactive state based on applying a touch input for selecting an object corresponding to discount information displayed in the second region 262, 263, 264, 265 to at least one of the first region 261 and the second region 262, 263, 264, 265, and apply a discount method corresponding to the selected object to execute payment while the first region 261 is in an inactive state based on applying a touch input for selecting any one of the plurality of objects to the first region 261.

According to still another embodiment, the controller 180 may display a plurality of objects corresponding to a plurality of accumulation methods, respectively, in the first region 261 in an inactive state based on applying a touch input for selecting an object corresponding to accumulation information displayed in the second region 262, 263, 264, 265 to at least one of the first region 261 and the second region 262, 263, 264, 265, and apply an accumulation method corresponding to the selected object to execute payment while the first region 261 is in an inactive state based on applying a touch input for selecting any one of the plurality of objects to the first region 261.

According to yet still another embodiment, the controller 180 may display a payment complete message in the second region 262, 263, 264, 265 based on the completion of payment while the first region 261 is in an inactive state.

On the other hand, the controller 180 may display an on the basis of corresponding to a preset payment method in the second region 262, 263, 264, 265, and execute payment while the first region 261 is in an inactive state with the preset payment method.

Furthermore, the controller 180 may start transmitting and receiving a signal to and from an external payment server while the first region 261 is in an inactive state based on security information received from a user being authenticated.

According to another embodiment, the controller 180 may display a payment complete message in the second region 262, 263, 264, 265 based on the completion of payment while the first region 261 is in an inactive state.

Figure 4A:
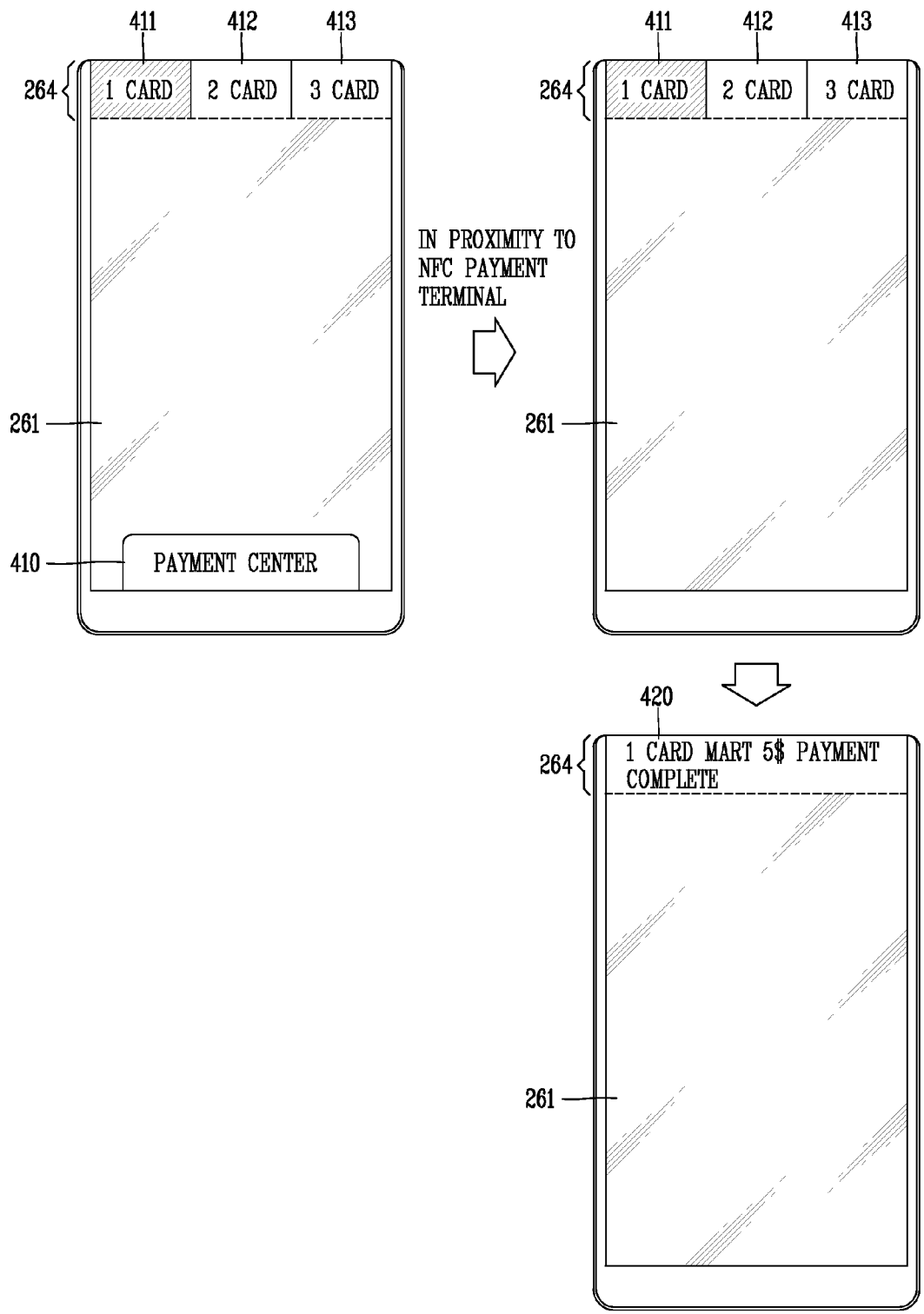
FIGS. 4A and 4B are conceptual views illustrating an embodiment of executing payment with a preset payment method.
Figure 4B:
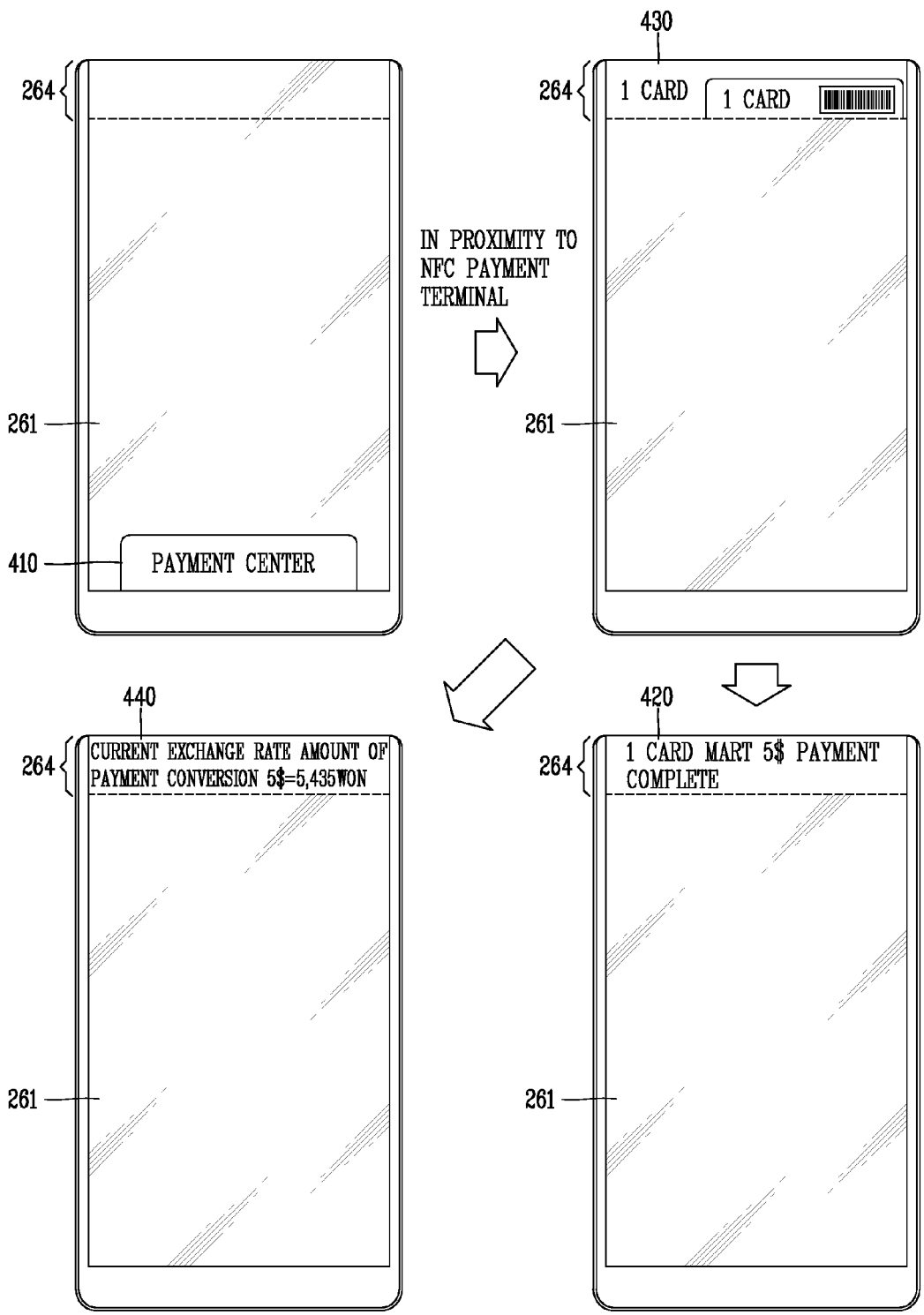

FIGS. 4A and 4B are conceptual views illustrating an embodiment of executing payment with a preset payment method.

Referring to FIG. 4A, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated, the second region 264 may be switched to an active state to display objects corresponding to a plurality of preset payment methods. Specifically, icons 411, 412, 423 corresponding to a first credit card, a second credit card and a third credit card may be displayed. The payment method denotes all other payable methods such as a check card, a reserve card or the like in addition to the credit cards.

Here, a specific icon 411 corresponding to a payment method (representative payment method) selected from a plurality of preset payment methods may be displayed in a highlighted manner. For example, the icon 411 may be displayed in a different color, brightness, font, shape or the like from the other icons 412, 413.

Furthermore, a menu icon 410 that can be entered into a payment application may be displayed in the first region 261 in an inactive state. According to an embodiment, when a user applies a touch input to the menu icon 410, the first region 261 may be switched to an active state to display an execution screen of a payment application. In this case, the first region 261 may maintain an active state even when his or her finger is released from the rear input unit 232.

When the first region 261 is in an inactive state, and icons 411, 412, 413 corresponding to a first credit card, a second credit card and a third credit card are displayed in the second region 264, a user may allow the terminal 100 to be in proximity to an external NFC payment terminal (system). As a result, payment may be carried out by the first credit card set to a representative payment method while the first region 261 is in an inactive state.

Upon the completion of payment, a message 420 indicating that payment has been completed may be displayed in the second region 264, and the first region 261 may still maintain an inactive state.

At this time, vibration or sound notification indicating the completion of payment may be displayed, and the first region 261 may still maintain an inactive state.

According to another embodiment, a pop-up window indicating the completion of payment may be temporarily displayed in the first region 261 in an inactive state.

According to still another embodiment, when payment has failed, the first region 261 may be switched to an active state along with vibration or sound notification to display a message indicating the failure of payment.

According to yet still another embodiment, referring to FIG. 4B, when security information received from a user while both the first region 261 and the second region 264 are in an inactive state is authenticated, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated as described above, a menu icon 410 that can be entered into a payment application may be displayed in the first region 261 in an inactive state. According to an embodiment, when a user applies a touch input to the menu icon 410, the first region 261 may be switched to an active state to display an execution screen of a payment application. In this case, the first region 261 may maintain an active state even when his or her finger is released from the rear input unit 232.

In a state that the first region 261 is in an inactive state as described above, a user may allow the terminal 100 to be in proximity to an external NFC payment terminal (system). Accordingly, information 430 on a first credit card set to a representative payment method may be displayed in the second region 264. Specifically, information such as a card name, a card expiration date, a barcode, and the like may be displayed. Concurrently or sequentially, payment may be carried out by the first credit card set to a representative payment method while the first region 261 is in an inactive state.

Upon the completion of payment, a message 420 indicating that payment has been completed may be displayed in the second region 264, and the first region 261 may still maintain an inactive state.

At this time, vibration or sound notification indicating the completion of payment may be displayed, and the first region 261 may still maintain an inactive state.

According to another embodiment, a pop-up window indicating the completion of payment may be temporarily displayed in the first region 261 in an inactive state.

According to still another embodiment, when payment has failed, the first region 261 may be switched to an active state along with vibration or sound notification to display a message indicating the failure of payment.

According to yet still another embodiment, in case of foreign payment, current exchange rate information and information 440 such as amounts converted by a current exchange rate may be displayed in the second region 264.

Referring to the embodiment of FIGS. 4A and 4B, payment may be carried out by determining a payment method then allowing the mobile terminal 100 to be in proximity to an NFC payment terminal or allowing the mobile terminal 100 to be in proximity to the NFC payment terminal then determining the payment method.

On the other hand, the controller 180 may display a plurality of objects corresponding to a plurality of payment methods, respectively, in the second region 262, 263, 264, 265, and execute payment while the first region 261 is in an inactive state with a payment method corresponding to the selected object based on applying a touch input for selecting any one of the plurality of objects to the second region 262, 263, 264, 265.

Figure 5:
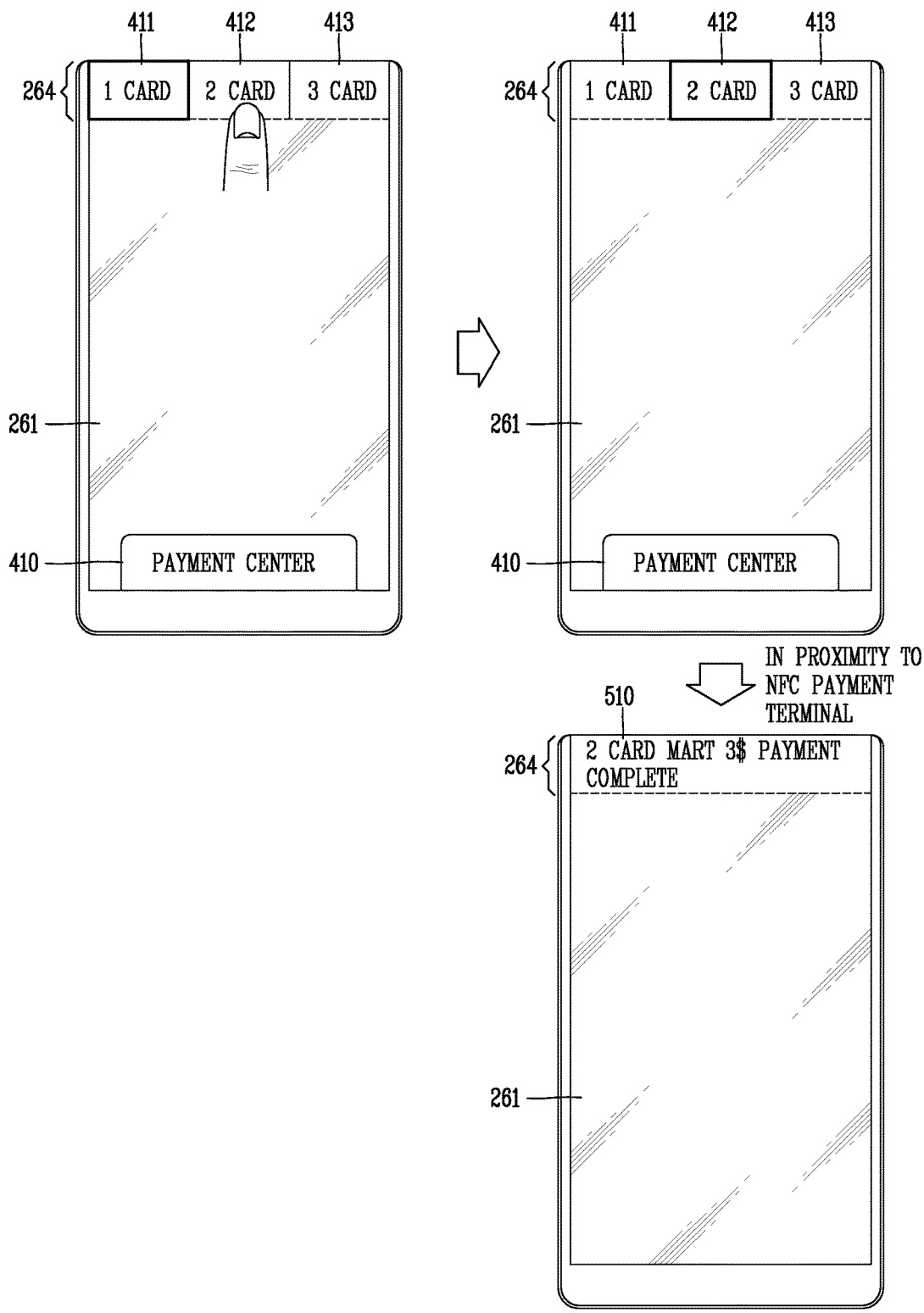
FIG. 5 is a conceptual view illustrating an embodiment of executing payment with a selected payment method.

FIG. 5 is a conceptual view illustrating an embodiment of executing payment with a selected payment method.

Referring to FIG. 5, when security information received from a user while both the first region 261 and the second region 264 are in an inactive state is authenticated, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated, the second region 264 may be switched to an active state to display objects corresponding to a plurality of preset payment methods. Specifically, icons 411, 412, 423 corresponding to a first credit card, a second credit card and a third credit card may be displayed. The payment method denotes all other payable methods such as a check card, a reserve card or the like in addition to the credit cards.

Here, a specific icon 411 corresponding to a payment method (representative payment method) selected from a plurality of preset payment methods may be displayed in a highlighted manner. For example, the icon 411 may be displayed in a different color, brightness, font, shape or the like from the other icons 412, 413.

Furthermore, a menu icon 410 that can be entered into a payment application may be displayed in the first region 261 in an inactive state. According to an embodiment, when a user applies a touch input to the menu icon 410, the first region 261 may be switched to an active state to display an execution screen of a payment application. In this case, the first region 261 may maintain an active state even when his or her finger is released from the rear input unit 232.

When the first region 261 is in an inactive state, and icons 411, 412, 413 corresponding to a first credit card, a second credit card and a third credit card are displayed in the second region 264, a user may select his or her desired payment method.

For example, a touch input may be applied to the icon 412 of the second credit card to select the second credit card. Accordingly, For example, the icon 412 may be displayed in a different color, brightness, font, shape or the like from the other icons 411, 413.

Subsequently, a user may allow the terminal 100 to be in proximity to an external NFC payment terminal (system). As a result, payment may be carried out by the second credit card selected as a payment method while the first region 261 is in an inactive state. As illustrated in FIG. 4A, the menu icon 410 that can be entered into a payment application may disappear during the execution of payment.

Upon the completion of payment, a message 510 indicating that payment has been completed may be displayed in the second region 264, and the first region 261 may still maintain an inactive state.

At this time, vibration or sound notification indicating the completion of payment may be displayed, and the first region 261 may still maintain an inactive state.

According to another embodiment, a pop-up window indicating the completion of payment may be temporarily displayed in the first region 261 in an inactive state.

According to still another embodiment, when payment has failed, the first region 261 may be switched to an active state along with vibration or sound notification to display a message indicating the failure of payment.

On the other hand, the controller 180 may display a first object corresponding to a first payment method in the second region 262, 263, 264, 265, and display a second object corresponding to a second payment method in the second region 262, 263, 264, 265 based on a preset touch input applied to the first region 261 in an inactive state.

Subsequently, the controller 180 may execute payment while the first region 261 is in an inactive state with the second payment method based on a preset touch input applied to the first region 261 in an inactive state in a state that the second object is displayed on the second region 262, 263, 264, 265.

Figure 6A:
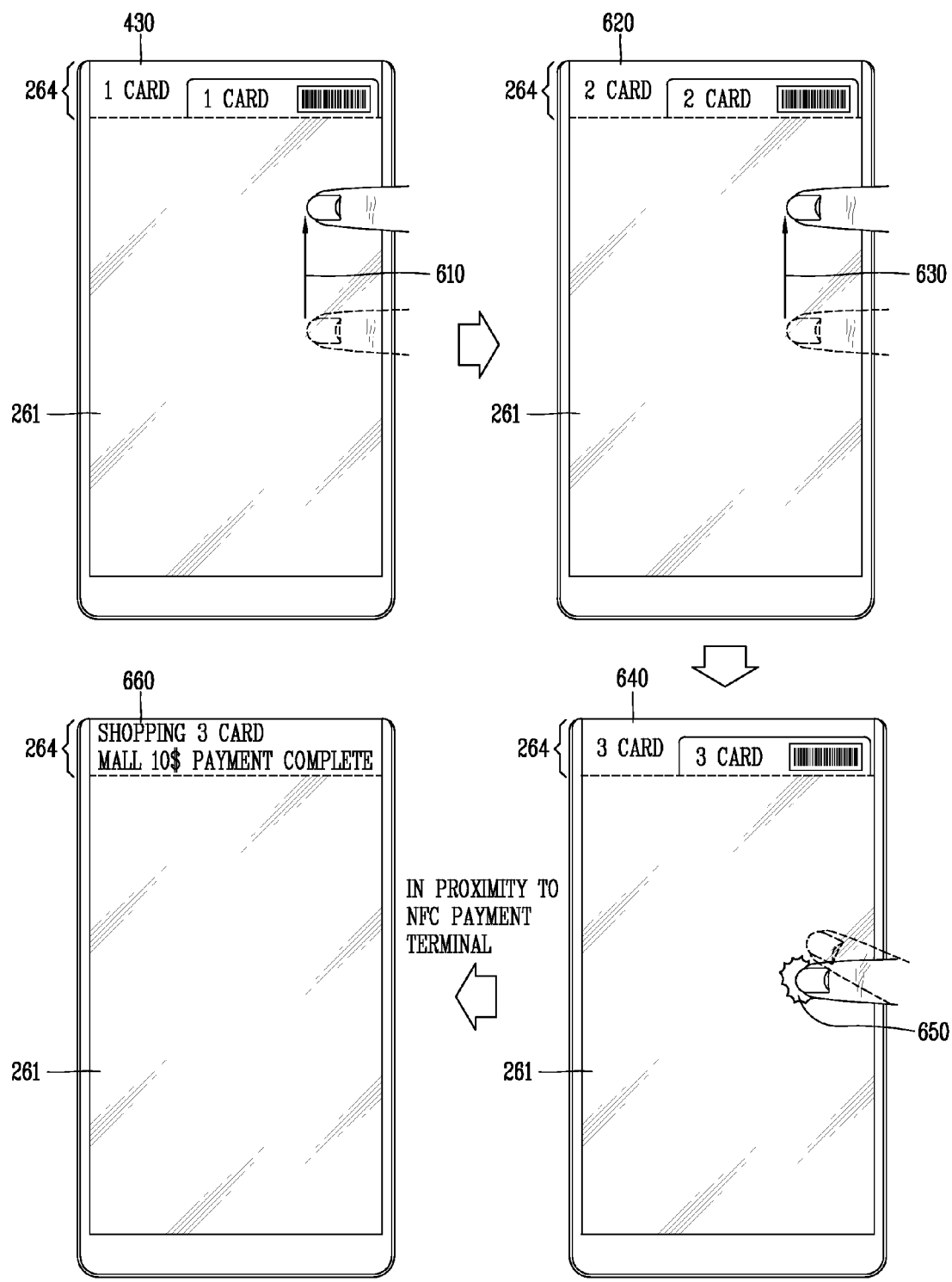
FIG. 6A is a conceptual view illustrating an embodiment of executing payment with a payment method selected based on applying a touch input to a front display in an inactive state.

FIG. 6A is a conceptual view illustrating an embodiment of executing payment with a payment method selected based on applying a touch input to a front display in an inactive state.

Referring to FIG. 6A, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated as described above, information 430 on a first credit card set to a representative payment method may be displayed in the second region 264. Specifically, information such as a card name, a card expiration date, a barcode, and the like may be displayed. At this time, a menu icon 410 that can be entered into a payment application may be displayed in the first region 261 in an inactive state as described above.

According to an embodiment, the first credit card may be a card previously set to a representative payment method or a card that has been used in previous payment. Otherwise, the first credit card may be a card recommended according to a payment frequency or payment amount or a card that does not exceed a payment limit.

Subsequently, when a user applies a flicking input 610 in an upward direction to the first region 261 in an inactive state, information 620 on a second credit card may be displayed on the second region 264.

According to another embodiment, when a user applies a flicking input in an upward direction to the second region 264 displayed with information 430 on a first credit card, information 620 on a second credit card may be displayed in the second region 264.

Similarly, when a user applies a flicking input 630 in an upward direction to the first region 261 in an inactive state in a state that information 620 on a second credit card is displayed in the second region 264, information 640 on a third credit card may be displayed in the second region 264.

According to still another embodiment, when a user applies a flicking input in an upward direction to the second region 264 displayed with information 620 on a second credit card, information 620 on a third credit card may be displayed in the second region 264.

According to yet still another embodiment, when a user applies a flicking input in a downward direction to the first region 261 in an inactive state in a state that information 620 on a second credit card is displayed in the second region 264, information 430 on a first credit card may be redisplayed in the second region 264.

According to still yet another embodiment, when a user applies a flicking input in a downward direction to the second region 264 in a state that information 620 on a second credit card is displayed in the second region 264, information 430 on a first credit card may be redisplayed in the second region 264.

As described above, a user may apply a double-tap input (knock input 650) to the first region 261 or second region 264 in an inactive state in a state information 620 on a second credit card is displayed in the second region 264. Accordingly, a third credit card may be selected as a payment method.

Subsequently, a user may allow the terminal 100 to be in proximity to an external NFC payment terminal (system). As a result, payment may be carried out by the third credit card selected as a payment method while the first region 261 is in an inactive state. As illustrated in FIG. 4A, the menu icon 410 that can be entered into a payment application may disappear during the execution of payment.

Upon the completion of payment, a message 660 indicating that payment has been completed may be displayed in the second region 264, and the first region 261 may still maintain an inactive state.

At this time, vibration or sound notification indicating the completion of payment may be displayed, and the first region 261 may still maintain an inactive state.

According to another embodiment, a pop-up window indicating the completion of payment may be temporarily displayed in the first region 261 in an inactive state.

According to still another embodiment, when payment has failed, the first region 261 may be switched to an active state along with vibration or sound notification to display a message indicating the failure of payment.

In other words, according to the embodiment of FIG. 6A, the first region 261 which is a main region may be used as a touch pad capable of configuring information displayed in the second region 264.

According to yet still another embodiment, a user may enter a payment application through a preset gesture.

Figure 6B:
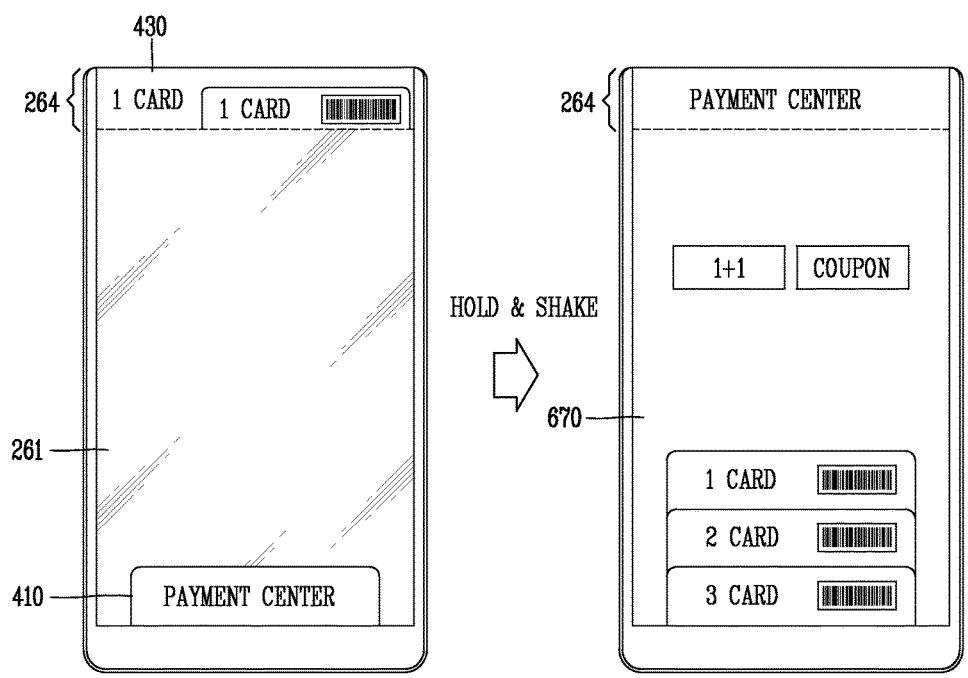
FIG. 6B is a conceptual view illustrating an embodiment of executing a payment application with a preset gesture.

FIG. 6B is a conceptual view illustrating an embodiment of executing a payment application with a preset gesture.

Referring to FIG. 6B, a menu icon 410 that can be entered into a payment application may be displayed in the first region 261 in an inactive state as illustrated in FIG. 6A, and a user may take a gesture for shaking the terminal 100 up and down while holding it in a state that information 430 on a first credit card is displayed in the second region 264.

Accordingly, the first region 261 is switched to an active state to display an execution screen 670 of the payment application. According to an embodiment, information on a first credit card, a second credit card and a third credit card may be displayed in the first region 261. Furthermore, information associated with coupons, memberships and the like may be displayed.

On the other hand, the controller 180 may display an input request message for security information in the second region 262, 263, 264, 265 when determined to correspond to a preset condition based on the signals transmitted to and received from the payment server and the payment related information.

Specifically, the controller 180 may display an input request message for security information in the second region 262, 263, 264, 265 when determined that an amount of payment is above a preset amount.

Subsequently, the controller 180 may execute payment while the first region 261 is in an inactive state based on the signals transmitted to and received from the payment server and the payment related information on the basis of security information entered to the first region 261 being authenticated.

FIGS. 7A through 7D are conceptual views illustrating an embodiment of an additional security information input.

Figure 7A:
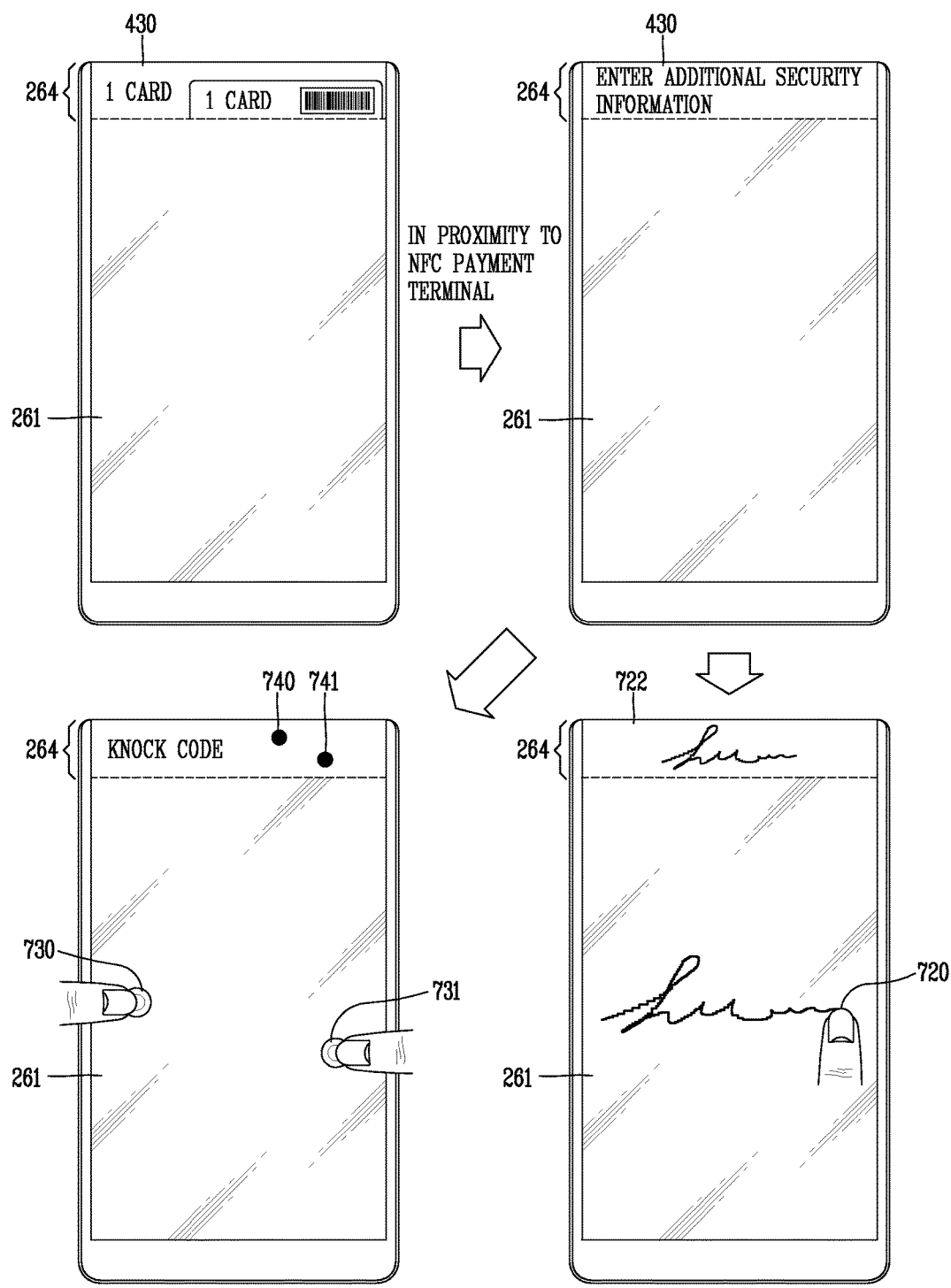
FIGS. 7A through 7D are conceptual views illustrating an embodiment of an additional security information input.

Referring to FIG. 7A, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated as described above, information 430 on a first credit card set to a representative payment method may be displayed in the second region 264. Specifically, information such as a card name, a card expiration date, a barcode, and the like may be displayed. At this time, a menu icon 410 that can be entered into a payment application may be displayed in the first region 261 in an inactive state as described above.

In a state that the first region 261 is in an inactive state as described above, a user may allow the terminal 100 to be in proximity to an external NFC payment terminal (system). Accordingly, an input request message 710 for additional security information may be displayed in the second region 264. Such an input request for additional security information may be requested when the payment amount is large payment above a preset amount.

A user may input his or her signature 720 in the first region 261 in an inactive state for additional security information. Here, the user's input signature 720 may be concurrently or sequentially displayed at the time of the user's input. The sequence or speed of a signature may be detected during the user's signature input to correctly perform user authentication. Furthermore, a signature 722 may be concurrently or sequentially displayed in the second region 264 in response to the signature 720 entered to the first region 261.

According to another embodiment, a user may input knock codes 730, 731 in the first region 261 in an inactive state for additional security information. Here, the knock codes 730, 731 entered by a user may be concurrently or sequentially displayed in the first region 261 at the time of the user's input. Furthermore, knock codes 740, 741 may be concurrently or sequentially displayed in the second region 264 in response to the knock codes 730, 731 inputted in the first region 261.

In other words, according to the embodiment of FIG. 7A, the first region 261 which is a main region may be used as a touchpad for security authentication.

Figure 7B:
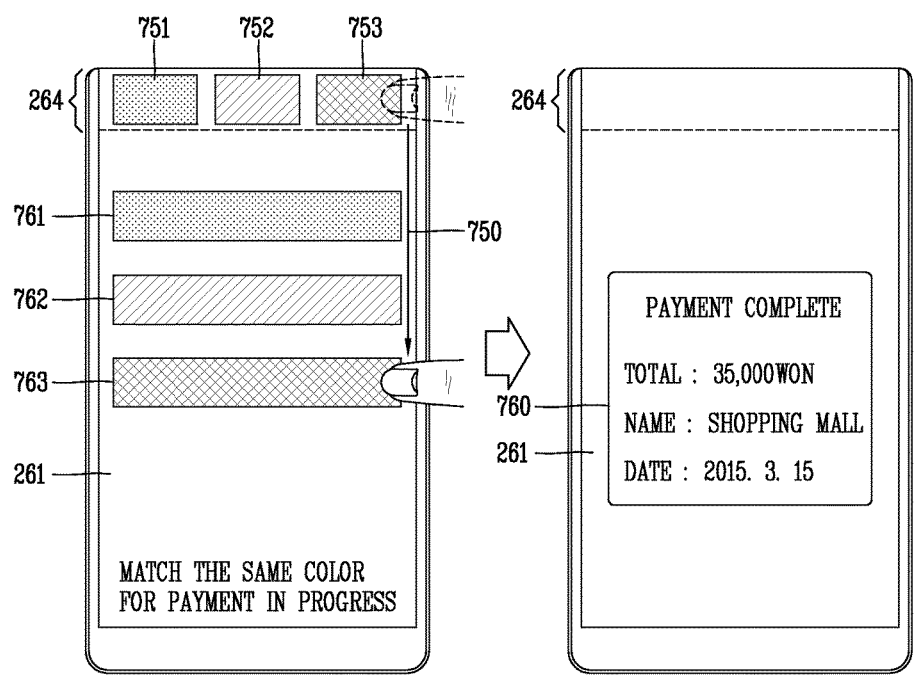

According to still another embodiment, referring to FIG. 7B, user authentication may be carried out in the manner of matching the same colors displayed in the first region 261 and the second region 264, respectively.

Specifically, when large payment above a preset amount should be carried out, icons 751, 752, 753 corresponding to a first color, a second color and a third color may be displayed in the second region 264 along with vibration notification. Furthermore, the first region 261 in an inactive state may be activated and icons 761, 762, 763 corresponding to the first color, the second color and the third color may be displayed therein.

Subsequently, the user may match the icons 751, 752, 753 displayed in the second region 264 with the icons 761, 762, 763 displayed in the first region 261, respectively, with the same colors for the execution of payment (or user authentication).

For example, an input for dragging the icon 751 of the first color displayed in the second region 264 to the icon 761 of the first color displayed in the first region 261 may be applied. Subsequently, an input for dragging the icon 752 of the second color displayed in the second region 264 to the icon 762 of the second color displayed in the first region 261 may be applied. Similarly, an input for dragging the icon 753 of the third color displayed in the second region 264 to the icon 763 of the third color displayed in the first region 261 may be applied. At this time, the sequence of a drag input may be carried out according to a preset sequence or in an arbitrary sequence.

When matching to the same color is completed, a payment complete message 760 may be displayed in the first region 261. A payment amount, a payment place, a shop, a payment date and the like may be displayed on the payment complete message 760.

According to another embodiment, user authentication may be carried out using a method of matching the same shape displayed in the first region 261 and second region 264, respectively. Alternatively, a fingerprint may be received again.

Figure 7C:
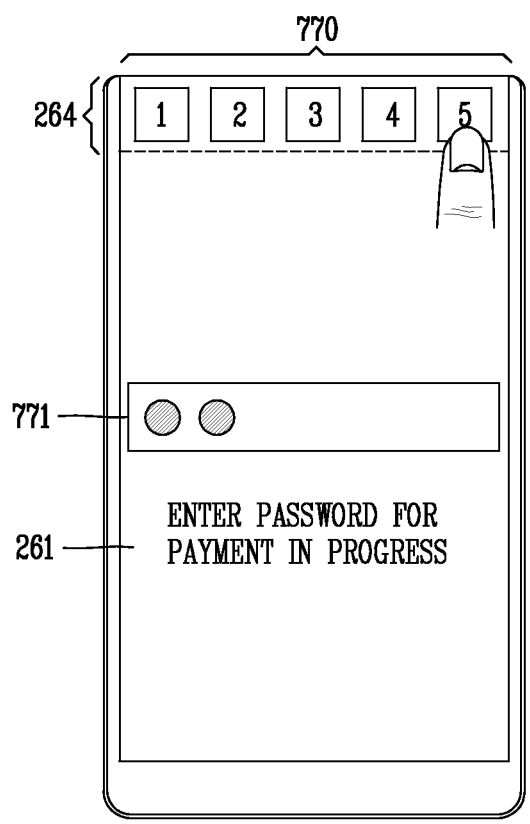
Figure 7D:
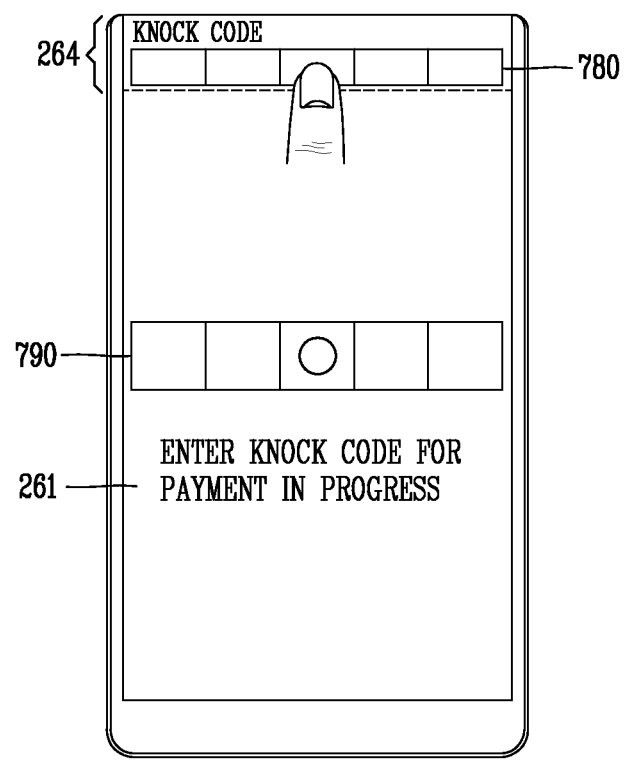

According to still another embodiment, referring to FIG. 7C, user authentication may be carried out using a method of receiving a preset password.

Specifically, when large payment above a preset amount is carried out, numerical icons 770 may be displayed in the second region 264 along with vibration notification. For an embodiment, icons with English characters, Korean characters, special symbols or combinations thereof, a keyboard layout or the like may be displayed according to the type of password. Furthermore, the first region 261 in an inactive state may be activated to display a display window 771 of a password being entered thereto.

Subsequently, the user may sequentially select icons corresponding to a password from numerical icons 770 displayed in the second region 264 for the execution of payment (or user authentication). Accordingly, an object corresponding to the user's selection may be displayed on the password display window 771 in the first region 261.

For example, the user may apply a touch input to an icon corresponding to a password among the numerical icons 770 displayed in the second region 264 to enter the password. Otherwise, an input for dragging an icon corresponding to a password among the numerical icons 770 displayed in the second region 264 to the password display window 771 in the first region 261 to enter the password. As a result, a password may be displayed on the password display window 771. Here, the password may be processed and displayed in unidentifiable arbitrary shapes for security.

When a preset password is entered, a payment complete message including a payment amount, a payment place, a shop, a payment date and the like may be displayed in the first region 261 as illustrated in FIG. 7B.

According to yet still another embodiment, referring to FIG. 7B, user authentication may be carried out using a method of receiving a preset knock code.

Specifically, when large payment above a preset amount should be carried out, a knock code input window 780 may be displayed in the 264 along with vibration notification. Furthermore, the first region 261 in an inactive state may be activated to display a display window 790 of a knock code being entered thereto.

Subsequently, the user may sequentially enter preset knock codes to the knock code input window 780 displayed in the second region 264 for the execution of payment (or user authentication). Accordingly, knock codes corresponding to the user's input may be sequentially displayed on the knock code display window 790 in the first region 261.

When a preset password is entered, a payment complete message including a payment amount, a payment place, a shop, a payment date and the like may be displayed in the first region 261 as illustrated in FIG. 7B.

According to still yet another embodiment, whether or not to receive additional security authentication during large payment may be set in advance. Furthermore, it may be set to receive at least one additional security information. For example, when the user's signature and password are authenticated, large payment may be carried out.

On the other hand, the controller 180 may start transmitting and receiving a signal to and from an external payment server while the first region 261 is in an inactive state based on security information received from a user being authenticated.

As described above, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information is authenticated to allow the terminal 100 to be in proximity to an NFC payment terminal, payment may be carried out while the first region 261 is in an inactive state with a preset payment method or selected payment method.

According to an embodiment, when payment is carried out subsequent to authenticating security information received from a user, additional information associated with payment other than payment amount information may be displayed in the second region 264. On the contrary, unless security information received from a user is authenticated, payment may not be carried out or only payment amount information may be displayed.

Figure 8A:
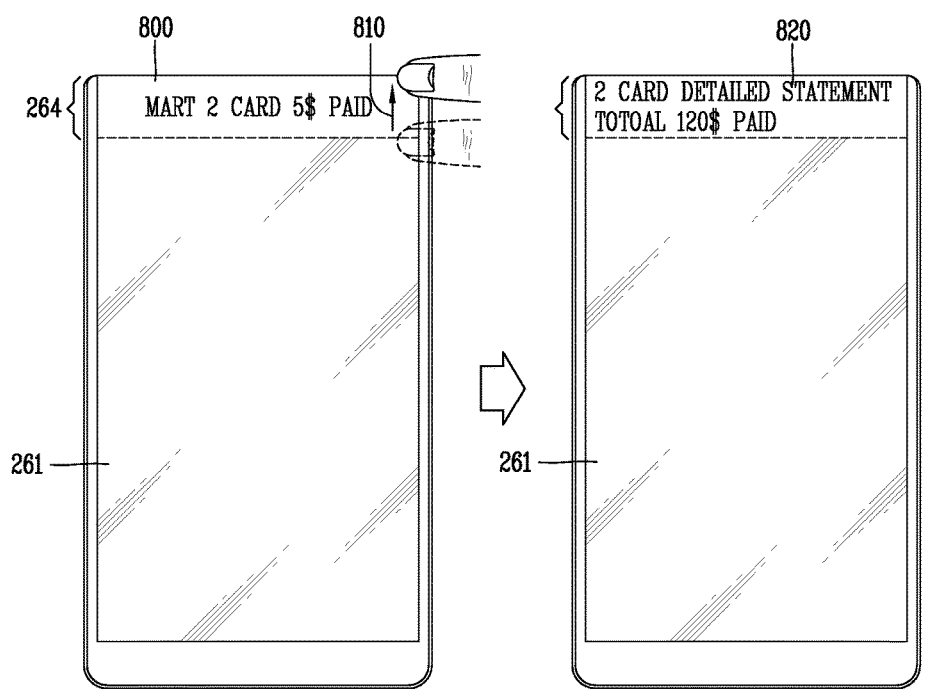
FIGS. 8A and 8B are conceptual views illustrating an embodiment of information that can be additionally displayed at the time of a user's authentication.
Figure 8B:
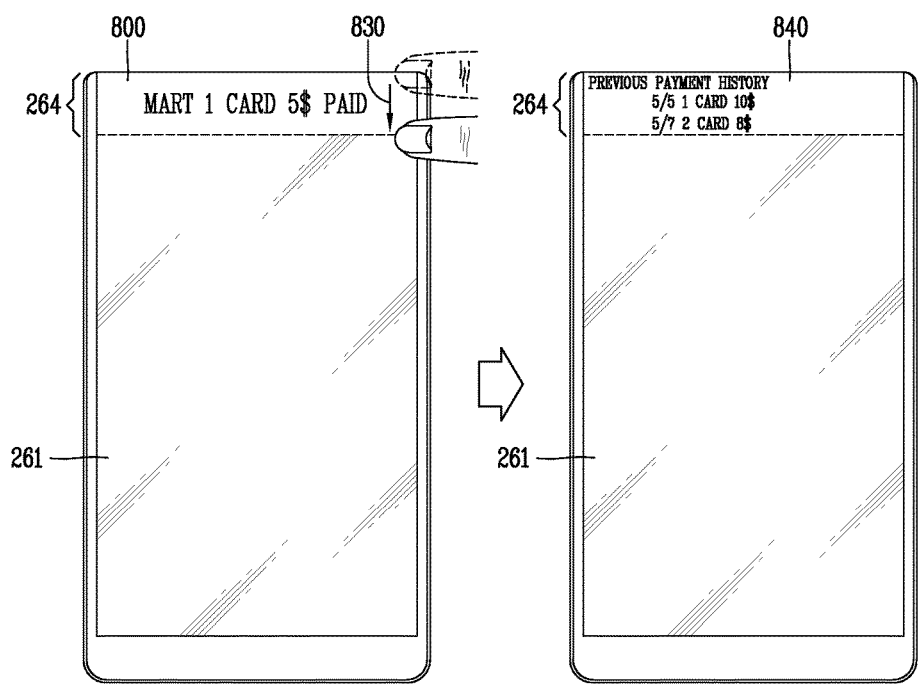

FIGS. 8A and 8B are conceptual views illustrating an embodiment of information that can be additionally displayed at the time of a user's authentication.

Referring to FIG. 8A, unless security information received from a user is authenticated, only payment amount information 800 may be displayed. On the contrary, when payment is carried out subsequent to authenticating security information received from a user, additional information 820 associated with payment in addition to the payment amount information 800 may be displayed in the second region 264.

Specifically, unless a fingerprint received from a user is authenticated, only the payment amount information 800 may be displayed. On the contrary, when payment is carried out subsequent to authenticating a fingerprint received from a user, the payment amount information 800 may be displayed. Subsequently, when a flicking input 810 in an upward direction is applied to the second region 264, additional information 820 such as an accumulative payment amount of the payment method or the like may be displayed in the second region 264.

For another embodiment, referring to FIG. 8B, unless a fingerprint received from a user is authenticated, only the payment amount information 800 may be displayed. On the contrary, when payment is carried out subsequent to authenticating a fingerprint received from a user, the payment amount information 800 may be displayed. Subsequently, when a flicking input 830 in a downward direction is applied to the second region 264, additional information 840 such as previous payment details or the like may be displayed in the second region 264.

On the other hand, the controller 180 may produce a plurality of payment methods for a plurality of consumption types, respectively, based on payment history information that has been executed for a preset period of time.

Specifically, the controller 180 may display a plurality of objects corresponding to the plurality of consumption types, respectively, in the second region 262, 263, 264, 265, and displays a plurality of objects corresponding to a plurality of payment methods, respectively, produced for a consumption type corresponding to the selected object in the first region 261 in an inactive state based on applying a touch input for selecting any one of the plurality of objects to at least one of the first region 261 and the second region 262, 263, 264, 265.

Subsequently, the controller 180 may execute payment while the first region 261 is in an inactive state with a payment method corresponding to the selected object based on applying a touch input for selecting any one of a plurality of objects displayed in the first region 261 in an inactive state to the first region 261.

Figure 9A:
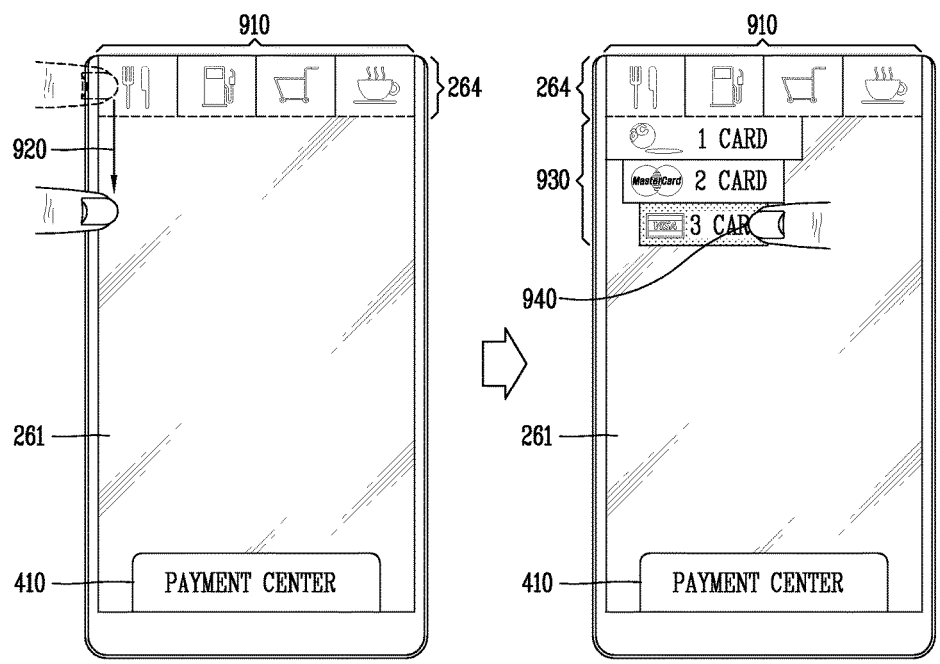
FIG. 9A is a conceptual view illustrating an embodiment of a payment method recommended based on a consumption type.

FIG. 9A is a conceptual view illustrating an embodiment of a payment method recommended based on a consumption type.

Referring to FIG. 9A, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated, the second region 264 may be switched to an active state to display menu icons 910 corresponding to a plurality of preset consumption types.

For example, icons 910 indicating categories such as eating-out, gas, shopping, beverage, and the like as consumption types may be displayed. Furthermore, a menu icon 410 that can be entered into a payment application may be displayed in the first region 261 in an inactive state.

Subsequently, when a user touches one of the menu icons 910 to select it and then applies a drag input 920 to the first region 261, icons 930 corresponding to a plurality of payment methods produced for the selected consumption type may be displayed in the first region 261 in an inactive state.

For example, when a user touches an eating-out icon and then applies a drag input 920 to the first region 261, icons 930 corresponding to payment methods that have been paid after eating-out may be displayed. Specifically, an icon corresponding to a payment method that has been frequently used may be preferentially displayed based on the user's payment history information. For another example, an icon corresponding to a payment method with a large amount of payment may be preferentially displayed.

Next, when a touch input 940 is applied to select one of icons 930 corresponding to payment methods to select it, and then the terminal 100 is brought into proximity to an NFC payment terminal, payment may be carried out with a payment method selected while the first region 261 is in an inactive state.

For still another example, a consumption type and a payment method corresponding thereto may be displayed based on a current location without selecting the consumption type. Specifically, icons 930 for payment methods corresponding to the eating-out category may be displayed based on the terminal 100 currently located at a restaurant being sensed.

Figure 9B:
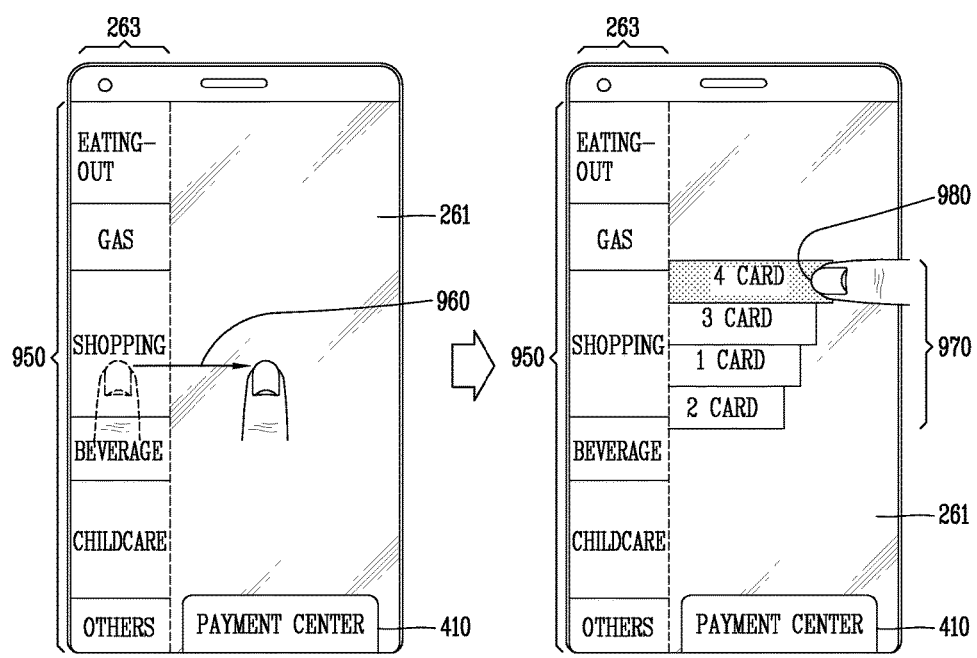
FIG. 9B is a conceptual view illustrating an embodiment of displaying a payment method recommended based on a consumption type on a lateral display, which is different from the embodiment of FIG. 9A.

FIG. 9B is a conceptual view illustrating an embodiment of displaying a payment method recommended based on a consumption type on a lateral display, which is different from the embodiment of FIG. 9A.

Referring to FIG. 9B, menu icons 950 corresponding to a plurality of consumption types may be displayed in the third region 263 which is a left display region.

Specifically, when security information received from a user is authentication while both the first region 261 and second region 264 are in an inactive state, a preset object may be displayed in the first region 261 and second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated as described above, the third region 263 may be switched to an active state to display menu icons 950 corresponding to a plurality of preset consumption types.

For example, icons 950 indicating categories such as eating-out, gas, shopping, beverage, and the like as consumption types may be displayed. Here, the size (or area of the region) of each of the category icons 950 may be displayed in a different manner according to the consumption frequency or amount. Specifically, in case of frequent payments or a large amount of payment due to eating-out or shopping, icons corresponding to eating-out or shopping may be displayed in a larger manner than the other icons. Furthermore, a menu icon 410 that can be entered into a payment application may be displayed in the first region 261 in an inactive state.

Subsequently, when a user touches one of the menu icons 950 to select it and then applies a drag input 960 to the first region 261, icons 970 corresponding to a plurality of payment methods produced for the selected consumption type may be displayed in the first region 261 in an inactive state.

For example, when a user touches a shopping icon and then applies a drag input 960 to the first region 261, icons 970 corresponding to payment methods that have been paid after shopping may be displayed. Specifically, an icon corresponding to a payment method that has been frequently used may be preferentially displayed based on the user's payment history information. For another example, an icon corresponding to a payment method with a large amount of payment may be preferentially displayed.

Next, when a touch input 980 is applied to select one of icons 970 corresponding to payment methods to select it, and then the terminal 100 is brought into proximity to an NFC payment terminal, payment may be carried out with a payment method selected while the first region 261 is in an inactive state.

On the other hand, contrary to the foregoing embodiments, a consumption type may be produced and displayed for each payment method.

Figure 9C:
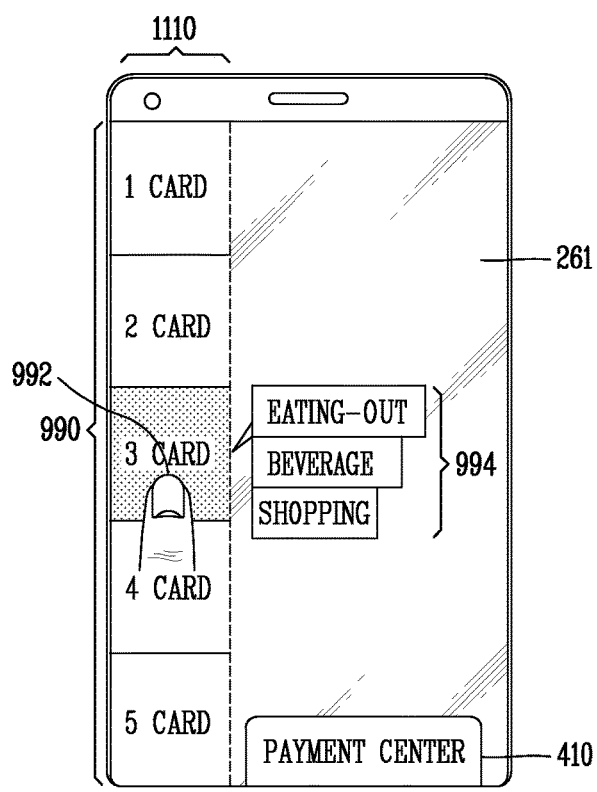
FIG. 9C is a conceptual view illustrating an embodiment of display a consumption type for a payment method.

FIG. 9C is a conceptual view illustrating an embodiment of display a consumption type for a payment method.

Referring to FIG. 9C, icons 990 corresponding to payment methods may be displayed in the third region 263. Here, the size (or area of the region) of icons 990 may be displayed in a different manner according to the consumption frequency or amount. In other words, an icon 992 of a card that has been frequently used or has been paid for a large amount may be displayed in a larger size.

When a touch input is applied to one 992 of the icons 990, consumption type information 994 that has been paid by a payment method of the selected icon 992 may be displayed. For example, an icon of a category that has been frequently used with the payment method or has been paid for a large amount may be preferentially displayed in a larger size.

On the other hand, the controller 180 may display a plurality of objects corresponding to a plurality of discount methods, respectively, in the first region 261 in an inactive state based on applying a touch input for selecting an object corresponding to discount information displayed in the second region 262, 263, 264, 265 to at least one of the first region 261 and the second region 262, 263, 264, 265, and apply a discount method corresponding to the selected object to execute payment while the first region 261 is in an inactive state based on applying a touch input for selecting any one of the plurality of objects to the first region 261.

According to another embodiment, the controller 180 may display a plurality of objects corresponding to a plurality of accumulation methods, respectively, in the first region 261 in an inactive state based on applying a touch input for selecting an object corresponding to accumulation information displayed in the second region 262, 263, 264, 265 to at least one of the first region 261 and the second region 262, 263, 264, 265, and applies an accumulation method corresponding to the selected object to execute payment while the first region 261 is in an inactive state based on applying a touch input for selecting any one of the plurality of objects to the first region 261.

Figure 10A:
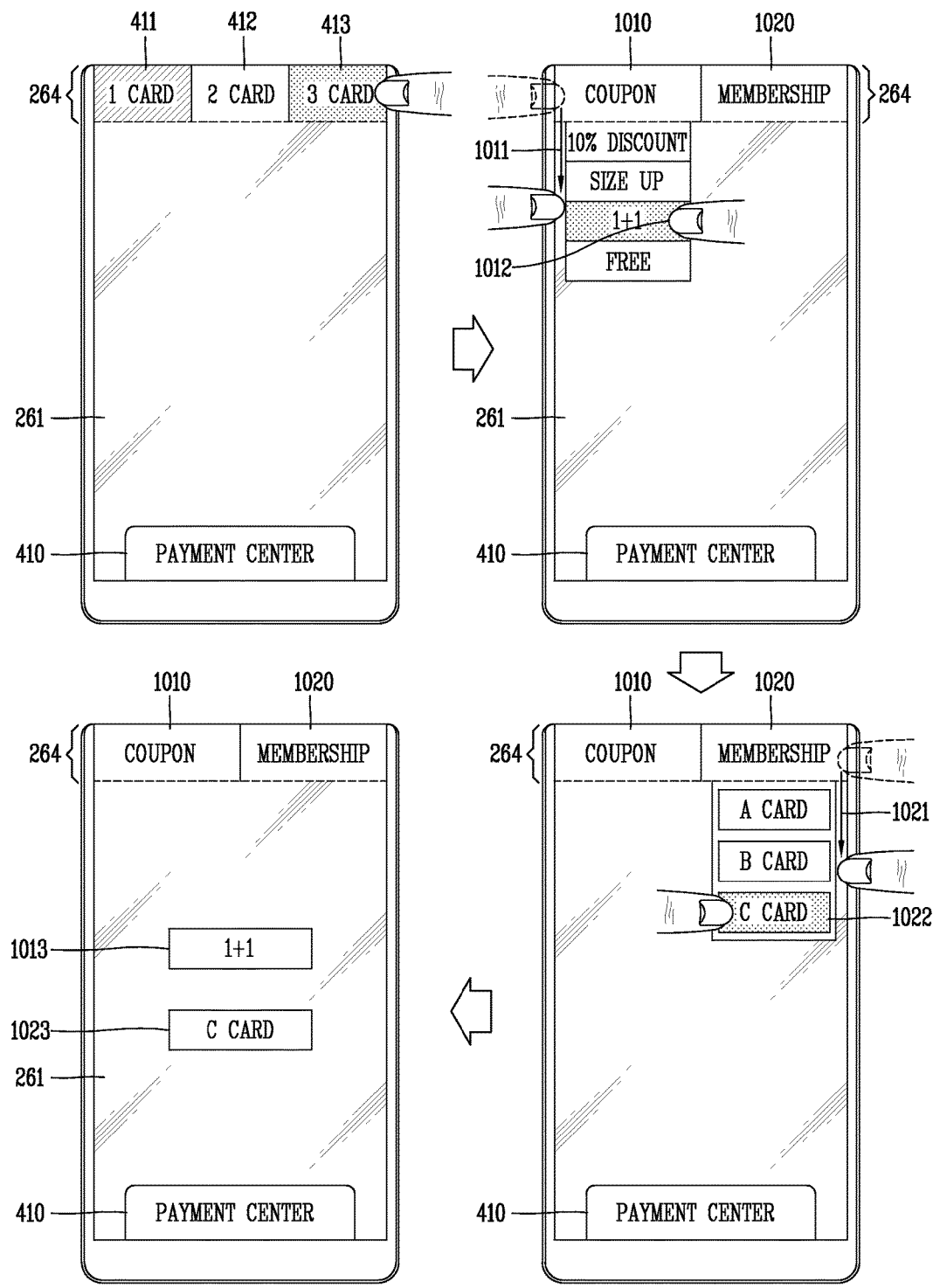
FIGS. 10A through 10C are conceptual views illustrating an embodiment of displaying discount information and accumulation information.
Figure 10B:
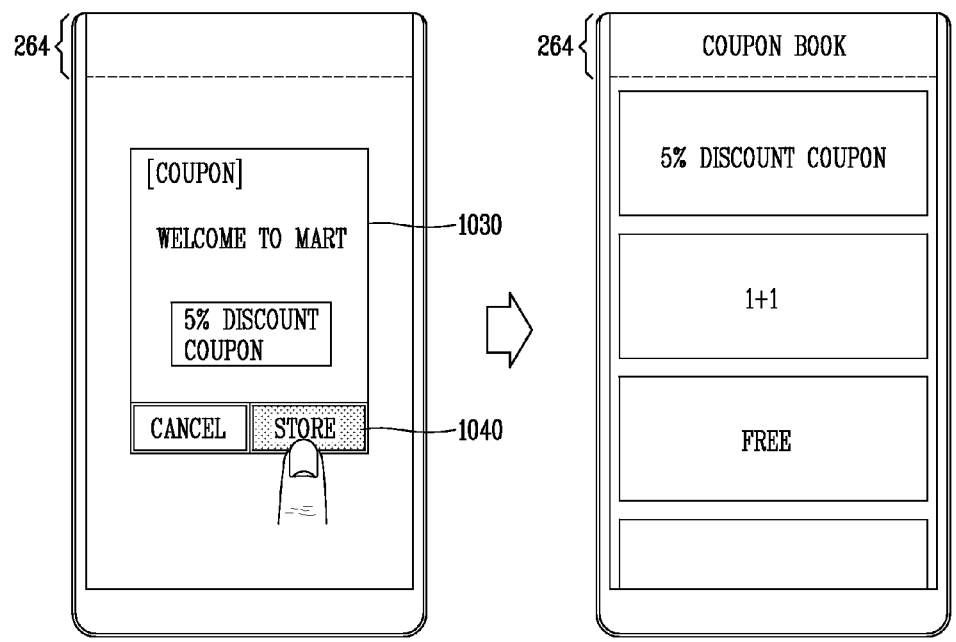
Figure 10C:
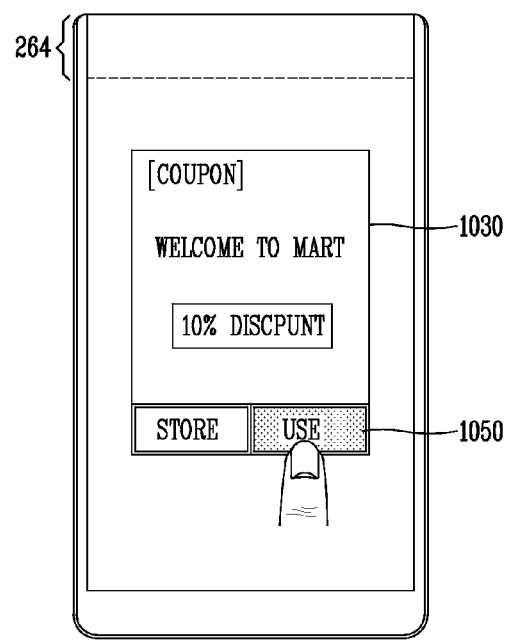

FIGS. 10A through 10C are conceptual views illustrating an embodiment of displaying discount information and accumulation information.

Referring to FIG. 10A, when security information received from a user is authenticated while both the first region 261 and the second region 264 are in an inactive state, a preset object may be displayed in the first region 261 and the second region 264.

According to an embodiment, a long touch input may be applied to the rear input unit 232 while both the first region 261 and the second region 264 are in an inactive state to enter a fingerprint. As a result, the fingerprint may be recognized by the fingerprint recognition sensor to authenticate security information.

According to another embodiment, a short touch input, a knock input or the like may be applied to the rear input unit 232 while both the first region 261 and the second region 264 are in an inactive state to switch the fingerprint recognition sensor in an inactive state to an active state. Subsequently, a long touch input may be applied again to the rear input unit 232 to enter a fingerprint. As a result, the fingerprint may be recognized by the fingerprint recognition sensor to authenticate security information.

When security information received from a user is authenticated as described above, the second region 264 may be switched to an active state to display objects corresponding to a plurality of preset payment methods. Specifically, icons 411, 412, 413 corresponding to a first credit card, a second credit card and a third credit card may be displayed. The payment method denotes all other payable methods such as a check card, a reserve card in addition to the credit cards.

Here, a specific icon 411 corresponding to a payment method (representative payment method) selected from a plurality of preset payment methods may be displayed in a highlighted manner. For example, the icon 411 may be displayed in a different color, brightness, font, shape or the like from the other icons 412, 413.

Furthermore, a menu icon 410 that can be entered into a payment application may be displayed in the first region 261 in an inactive state. According to an embodiment, when a user applies a touch input to the menu icon 410, the first region 261 may be switched to an active state to display an execution screen of a payment application. In this case, the first region 261 may maintain an active state even when his or her finger is released from the rear input unit 232.

Subsequently, a user may touch an icon 413 corresponding to a third credit card to select the third credit card as a payment method. The icon 413 corresponding to the third credit card may be displayed in a highlighted manner by such a touch input. Otherwise, when a predetermined period of time has passed without any touch input, the first credit card which is a representative payment method may be selected.

When a payment method is selected as described above, an icon 1010 corresponding to coupon selection and an icon 1020 corresponding to membership selection may be displayed. Specifically, when touching a coupon select icon and then applying a drag input 1011 to the first region 261 in an inactive state, coupon information that can be used during the payment process may be displayed. For example, a 10% discount coupon, a size-up coupon, a 1+1 coupon, a free coupon, and the like may be displayed. A user may apply a touch input 1012 to one of them to select it.

Similarly, when touching a membership select icon and then applying a drag input 1021 to the first region 261 in an inactive state, card information that can be accumulated during the payment process may be displayed. A user may apply a touch input 1022 to one of them to select it.

When a coupon and a reserve card to be used during the payment process are selected, information 1013, 1023 on them may be displayed in the first region 261 in an inactive state. For example, an icon 1013 of the selected coupon and an icon 1023 of the selected reserve card may be displayed in the first region 261 in an inactive state.

When a coupon and a reserve card to be used during the payment process are selected and then the terminal 100 is brought into proximity to an NFC payment terminal, payment may be carried out with the selected payment method. At this time, the selected coupon and reserve card will be applied.

As FIG. 10A is an embodiment, the sequence of payment method selection, coupon selection and reserve card selection may be carried out in an arbitrary manner. For example, the reserve card and coupon are first selected and then a payment method may be selected.

According to another embodiment, first, the terminal 100 may be brought into proximity to an NFC payment terminal, and then a payment method, coupon or reserve card may be selected. Otherwise, subsequent to selecting a payment method, the terminal 100 is brought into proximity to an NFC payment terminal, and then a coupon or reserve card may be selected.

According to still another embodiment, referring to FIG. 10B, upon sensing the terminal 100 being entered into a specific store, coupon information that can be used in the store may be displayed. Specifically, the terminal 100 being entered into a specific store may be sensed with a beacon. Furthermore, the first region 261 in an inactive state may be switched to an active state to display coupon information 1030 that can be used in a store.

Accordingly, when a user touches a store icon 1040 to store the relevant coupon, the relevant coupon may be stored to display total retained coupon information.

According to yet still another embodiment, referring to FIG. 10C, first, when the terminal 100 is brought into proximity to an NFC payment terminal the first region 261 in an inactive state may be switched to an active state to display coupon information 1030 that can be used in a store. Accordingly, when a user touches a use icon 1050, the relevant coupon may be used during the payment process.

According to an embodiment, when a payment method is determined with a small amount of payment, payment may be immediately carried out.

On the other hand, the terminal 100 may be brought into proximity to a payment terminal to pay a fare while using public transportation.

Figure 11:
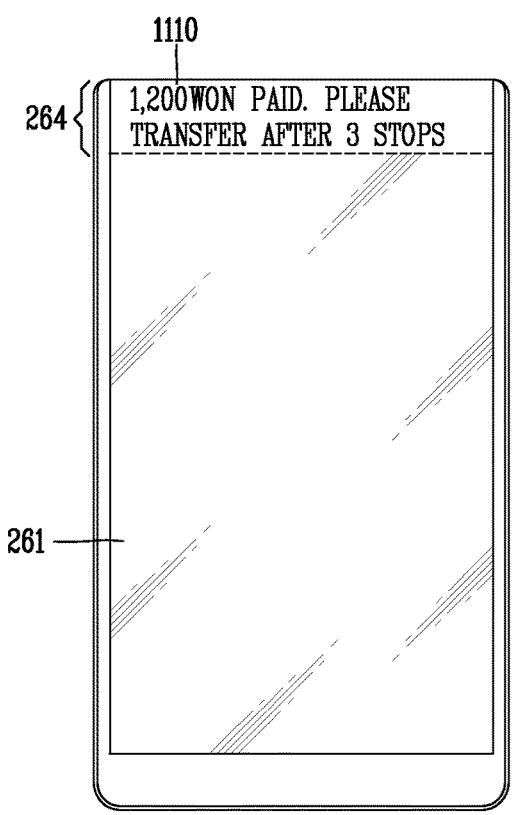
FIG. 11 is a conceptual view illustrating an embodiment of displaying related information when using public transportation.

FIG. 11 is a conceptual view illustrating an embodiment of displaying related information when using public transportation.

Referring to FIG. 11, when the terminal 100 is brought into proximity to a payment terminal to pay a fare while using public transportation, the first region 261 may maintain an inactive state. Here, an amount of payment or transit information, an arrival time or the like 1110 may be displayed in the second region 264.

In this regard, an NFC module may be operated in a card mode. In this case, the mobile terminal may transfer card information stored therein to the outside like a traditional IC card. Specifically, when a mobile terminal in which the card information of a payment card is stored is in proximity to a fare payment device such as a bus card or the like, mobile near-field payment may be processed. A transportation card may be mounted on a security module in an applet form, and the security module may store card information on the mounted card. Here, the card information of a payment card may be at least one of the card number, balance and detailed statement.

The effect of a mobile terminal and a control method thereof according to the present disclosure will be described as follows.

According to at least one of the foregoing embodiments of the present disclosure, it has an advantage that payment may be carried out using a lateral display even while a front display is in an inactive state. Accordingly, it may be possible to reduce the power consumption of a battery.

In addition, According to at least one of the foregoing embodiments of the present disclosure, it has an advantage that an authentication process is added to carry out a safe and quick payment.

As a result, it may be possible to enhance the user's convenience.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal optimized for reducing power consumption, comprising:
    a body having a front side, a lateral side, and a rear side;
    a wireless communication unit located within the body;
    a display having a first region located at the front side and a second region adjacent to the first region and extending to the lateral side; and
    a controller configured to:
    deactivate the first region and the second region;
    activate the second region and display an object corresponding to a preset payment method in the second region based on data received from an external payment server via the wireless communication unit;
    execute payment using the preset payment method in response to the mobile terminal being in proximity to an external payment terminal in a state where the object is displayed on the activated second region and the first region is in an inactive state;
    based on completion of the payment, display a message indicating that the payment has been completed in the activated second region and maintain the first region in the inactive state;
    when the payment has failed, activate the deactivated first region and display a message indicating the failure of the payment in the activated first region;
    identify a consumption type and a plurality of payment methods corresponding to the consumption type based on a current location of the mobile terminal, wherein the consumption type is type of product or service that can be purchased; and
    cause the display to display in the first region, which has been switched to an active state, a plurality of objects corresponding to the plurality of payment methods associated with the identified consumption type, wherein the plurality of objects is displayed sequentially according to criteria based on payment history information;
    in response to the sensing of a gesture for shaking the mobile terminal in a state where the object is displayed on the activated second region and the first region is in an inactive state:
    activate the deactivated first region; and
    display an execution screen of a payment application in the activated first region.

2. The mobile terminal of claim 1, wherein the controller is further configured to:
    cause the display to display a plurality of objects each corresponding to one of a plurality of payment methods in the second region; and
    execute payment while the first region is in an inactive state with a payment method corresponding to a selected object among the plurality of objects based on a touch input received at the selected object.

3. The mobile terminal of claim 1, wherein the controller is further configured to:
    cause the display to display a first object corresponding to a first payment method in the second region, and display a second object corresponding to a second payment method in the second region, wherein the displaying of the first object and the second object is in response to a touch input received at the first region of the display while the first region is in the inactive state.

4. The mobile terminal of claim 3, wherein the controller is further configured to:
    execute payment while the first region is in the inactive state with the second payment method in response to a further touch input received at the first region while the first region is in the inactive state and while the second object is displayed in the second region of the display.

5. The mobile terminal of claim 1, wherein the controller is further configured to:
    cause the display to display an input request for security information in the second region according to further data received from the payment server received via the wireless communication unit and the payment related information.

6. The mobile terminal of claim 5, wherein the controller is further configured to:
    execute payment while the first region is in the inactive state based on the further data received from the payment server, the payment related information, and on a basis of security information input via the first region.

7. The mobile terminal of claim 1, wherein the controller is further configured to:
    cause the display to display an input request message for security information in the second region when an amount of payment is above a threshold amount.

8. The mobile terminal of claim 1, wherein the controller is further configured to:
    transmit the payment information to the external payment server while the first region is in an inactive state based on security information received from a user.

9. The mobile terminal of claim 1, wherein the controller is further configured to:
    identify a plurality of payment methods for a respective plurality of consumption types based on payment history information for a defined period of time, wherein each of the plurality of consumption types is a type of product or service that can be purchased.

10. The mobile terminal of claim 9, wherein the controller is further configured to:
    cause the display to display in the second region a plurality of objects, each corresponding to a respective one of the plurality of consumption types; and
    cause the display to display in the first region a plurality of objects corresponding to a plurality of payment methods associated with a selected one the plurality of consumption types.

11. The mobile terminal of claim 10, wherein the controller is further configured to:
execute payment while the first region is in the inactive state with a payment method corresponding to a selected payment method among the plurality of payment methods.

12. The mobile terminal of claim 1, wherein the controller is further configured to:
cause the display to display in the second region an object corresponding to discount information;
cause the display to display in the first region a plurality of objects corresponding to a plurality of discount methods in response to a touch input selecting the object corresponding the discount information; and
apply a discount method corresponding to a selected discount method among the plurality of discount methods when executing payment.

13. The mobile terminal of claim 1, wherein the controller is further configured to:
cause the display to display in the second region accumulation information; and
cause the display to display in the first region a plurality of objects, each corresponding to a respective one of a plurality of accumulation methods, in response to selection of the accumulation information, wherein each of the plurality of accumulation methods is a method for collecting credit for a discount on future purchases; and
apply an accumulation method corresponding to a selected accumulating method among the plurality of accumulation methods to execute payment.

14. The mobile terminal of claim 1, wherein the controller is further configured to:
cause the display to display a payment complete message in the second region based on completion of payment while the first region is in an inactive state.

15. A payment method for a mobile terminal optimized for reducing power consumption and having a display that includes a first region located at the front side of the terminal and a second region adjacent to the first region and extending to a lateral side of the terminal, the method comprising:
deactivating the first region and the second region;
activating the second region and displaying an object corresponding to a preset payment method in the second region based on data received from an external payment server via a wireless communication unit;
executing payment using the preset payment method in response to the mobile terminal being in proximity to an external payment terminal in a state where the object is displayed on the activated second region and the first region is in an inactive state;
based on completion of the payment, displaying a message indicating that the payment has been completed in the activated second region and maintaining the first region in the inactive state;
when the payment has failed, activating the deactivated first region and displaying a message indicating the failure of the payment in the activated first region;
identifying a consumption type and a plurality of payment methods corresponding to the consumption type based on a current location of the mobile terminal, wherein the consumption type is type of product or service that can be purchased; and
displaying in the first region of the display, which has been switched to an active state, a plurality of objects corresponding to the plurality of payment methods associated with the identified consumption type, wherein the plurality of objects is displayed sequentially according to criteria based on payment history information;
in response to the sensing of a gesture for shaking the mobile terminal in a state where the object is displayed on the activated second region and the first region is in an inactive state:
activating the deactivated first region; and
displaying an execution screen of a payment application in the activated first region.

16. The method of claim 15, further comprising:
displaying an object corresponding to a preset payment method in the second region; and
wherein the transmitting includes executing payment using the preset payment method while the first region is in an inactive state.

17. The method of claim 15, further comprising:
displaying a plurality of objects each corresponding to one of a plurality of payment methods in the second region; and
wherein the transmitting includes executing payment while the first region is in an inactive state with a payment method corresponding to a selected object among the plurality of objects based on a touch input received at the selected object.

18. The method of claim 15, further comprising:
causing the display to display a first object corresponding to a first payment method in the second region, and display a second object corresponding to a second payment method in the second region, wherein the displaying of the first object and the second object is in response to a touch input received at the first region of the display while the first region is in the inactive state; and
wherein the transmitting includes executing payment while the first region is in the inactive state with the second payment method in response to a further touch input received at the first region while the first region is in the inactive state and while the second object is displayed in the second region of the display.

19. The method of claim 15, further comprising:
identifying a plurality of payment methods for a respective plurality of consumption types based on payment history information for a defined period of time, wherein each of the plurality of consumption types is a type of product or service that can be purchased.

* * * * *